United States Patent [19]

Holland

[11] Patent Number: 4,573,548
[45] Date of Patent: Mar. 4, 1986

[54] MOBILE BASE FOR ROBOTS AND THE LIKE

[75] Inventor: John M. Holland, Shawsville, Va.

[73] Assignee: Cybermation, Inc., Roanoke, Va.

[21] Appl. No.: 535,168

[22] Filed: Sep. 23, 1983

[51] Int. Cl.$^4$ .................. B62D 57/00; B60B 39/00
[52] U.S. Cl. .............................. 180/211; 180/212; 180/252
[58] Field of Search ............. 180/252, 253, 255, 261, 180/267, 209, 210, 211, 212

[56] References Cited

U.S. PATENT DOCUMENTS

| | | | |
|---|---|---|---|
| 3,336,993 | 8/1967 | Carobbe | 180/211 |
| 3,822,757 | 7/1974 | Spence | 180/255 |
| 3,858,673 | 1/1975 | Browning | 180/211 |
| 4,463,821 | 8/1984 | Falamak | 180/168 |

Primary Examiner—Joseph F. Peters, Jr.
Assistant Examiner—Donn McGiehan
Attorney, Agent, or Firm—Robert H. Ware; Melvin I. Stoltz; Alfred A. Fressola

[57] ABSTRACT

A mobile base for robots or other devices requiring a transport mechanism is disclosed incorporating a plurality of wheels which are simultaneously driven and steered by separate drive sources so as to allow the mobile base to change direction without rotation of the mobile base. In an additional embodiment, each wheel is located on an extensible leg assembly which can be rotated to project outwardly from the mobile base and thereby provide additional stability to the base. This adaptive, retractable leg synchro-drive mobile base uses a third drive source to perform the extension and retraction of the leg assemblies and provides that the wheels maintain their orientation while extension or retraction occurs while the mobile base is in translation and that the wheel orientation returns to its previous state if retraction or extension occurs while the base is not in translation.

23 Claims, 32 Drawing Figures

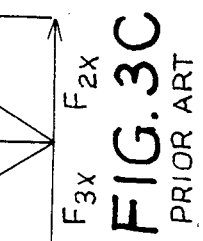
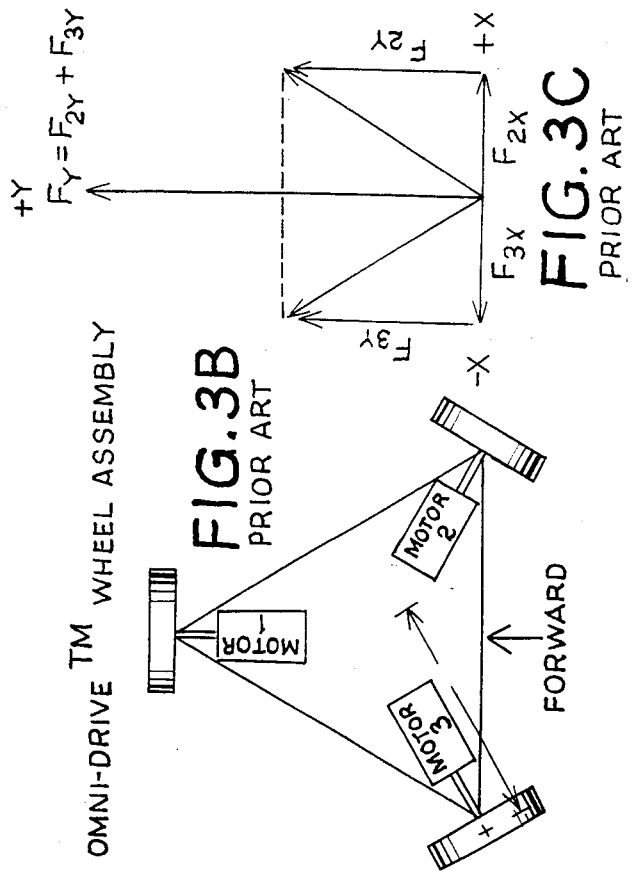
FIG. 3A
PRIOR ART
FIG. 3B
PRIOR ART
OMNI-DRIVE™ WHEEL ASSEMBLY
FIG. 3C
PRIOR ART
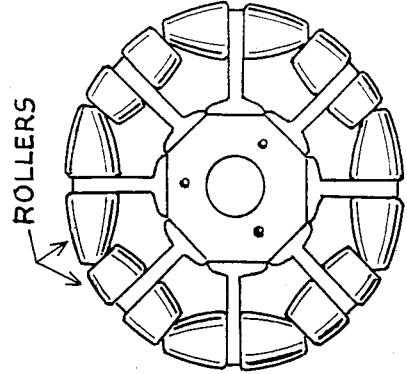
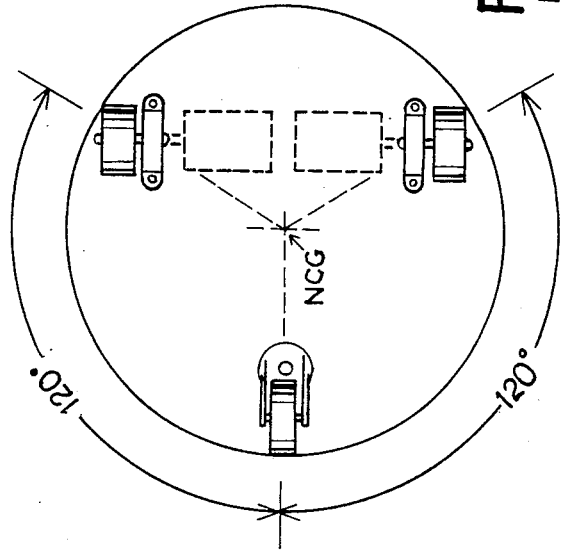
FIG. 2A
PRIOR ART
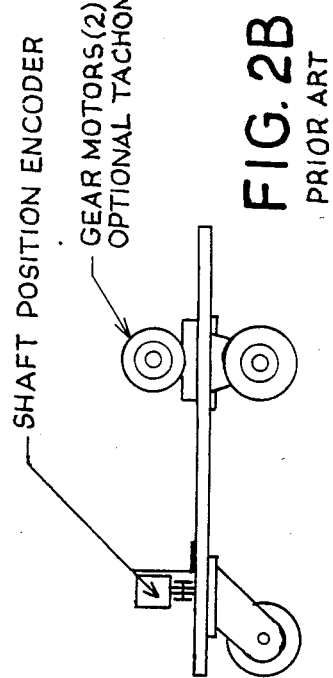
FIG. 2B
PRIOR ART

DEFINITION OF PITCH AND ROLL

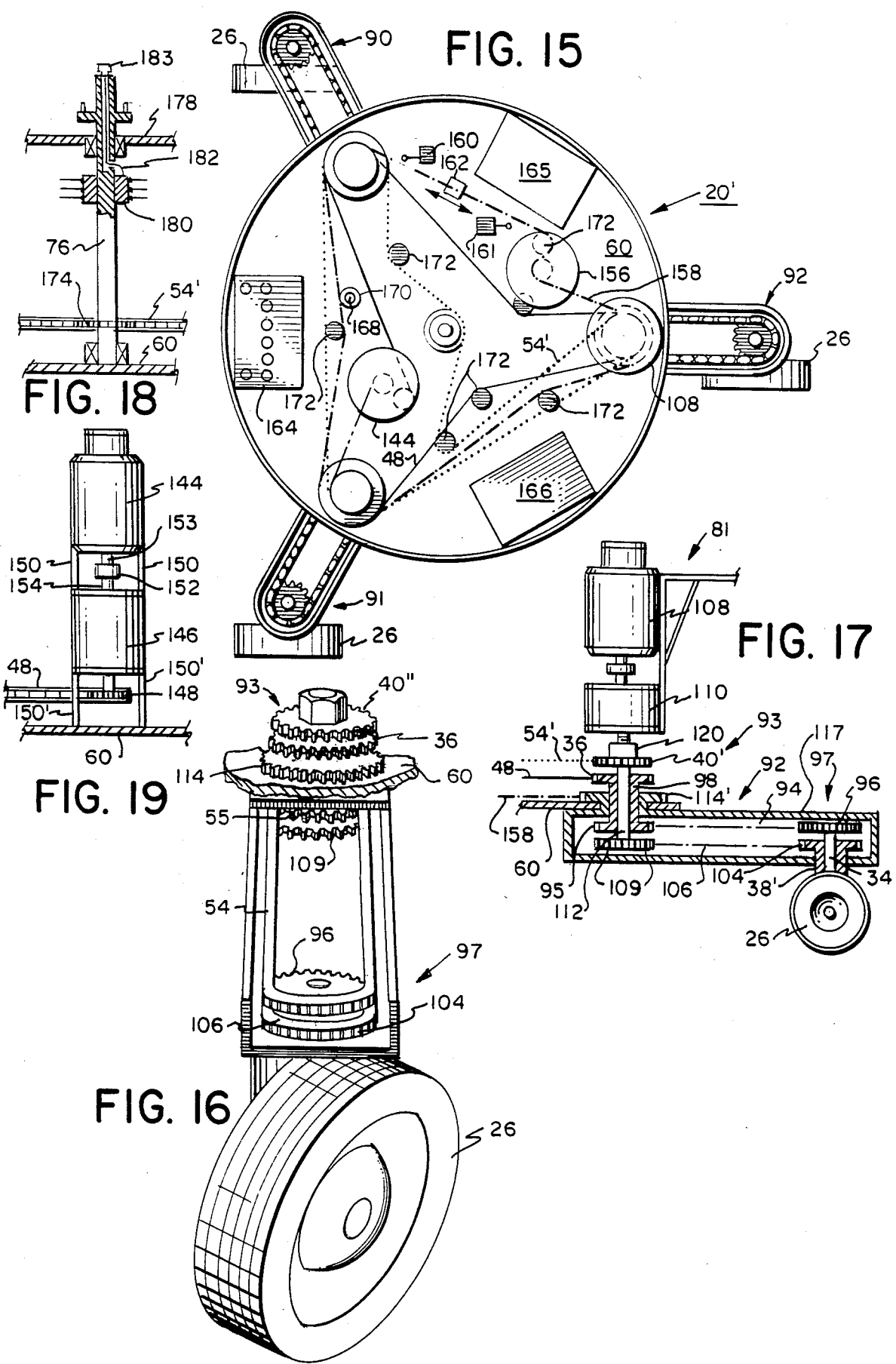

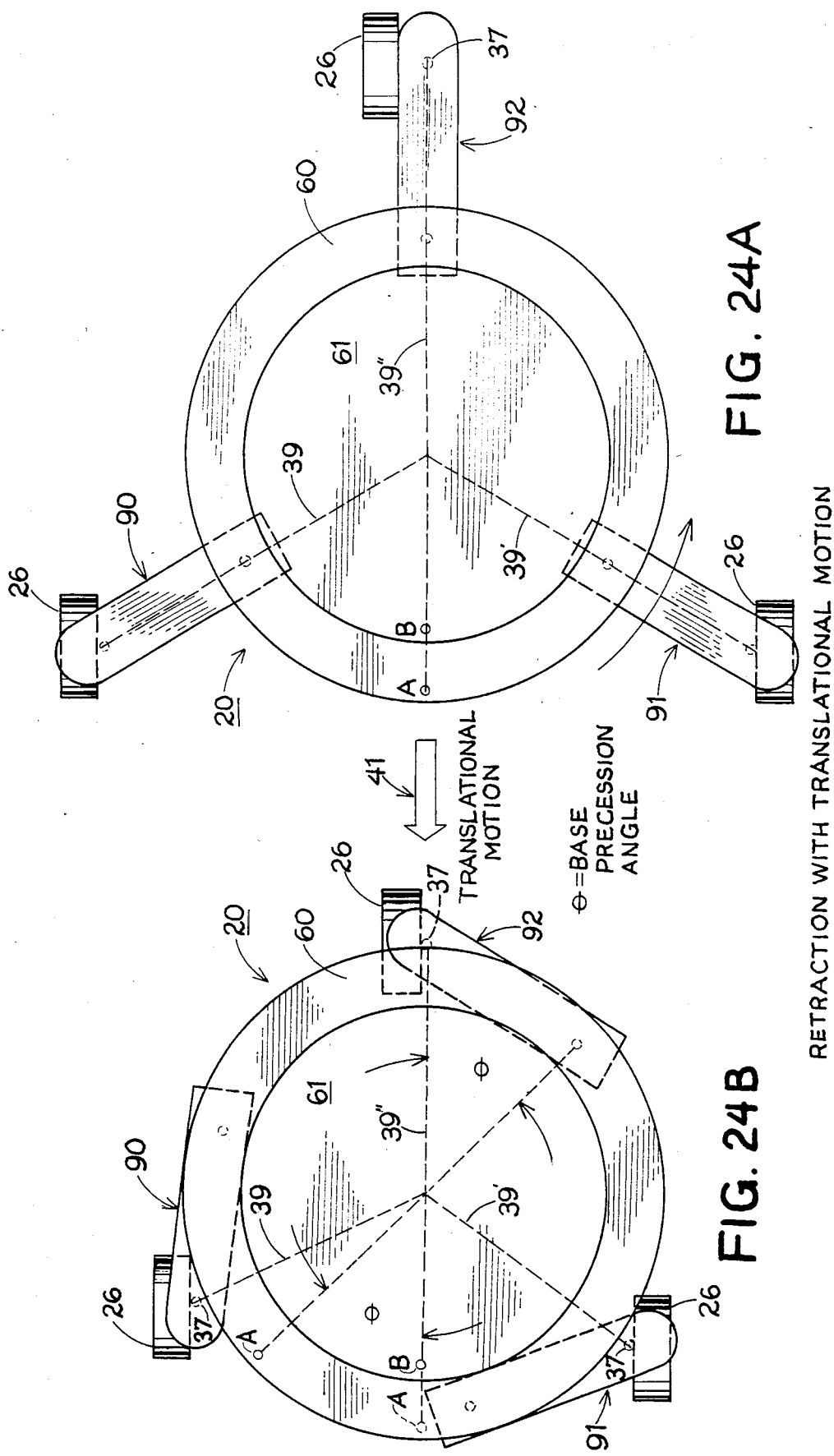

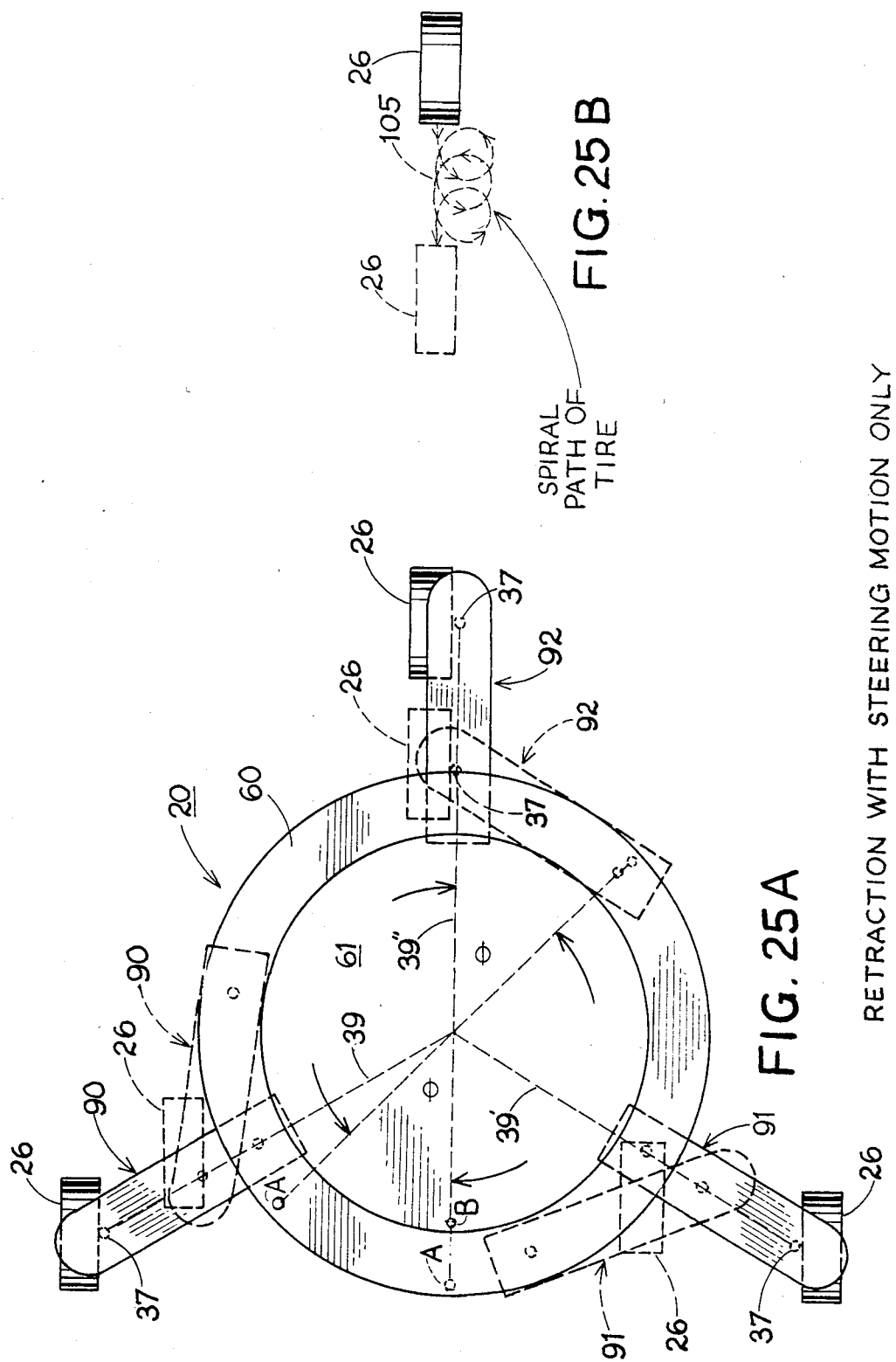

MOBILE BASE FOR ROBOTS AND THE LIKE

TECHNICAL FIELD

The present invention is directed to mobile basis (also called carriage systems) used to form mobile platforms upon which robots or other manipulating devices may be placed so as to allow these devices to be independently movable along a surface.

BACKGROUND ART

Mobile bases for use with and forming part of robots and the like allow such devices to operate along relatively planar surfaces, such as a floor of an industrial facility. Such mobile robots are commonly used in industrial applications for transporting products from one location to another as well as aiding in the retooling of machines, including grinding and milling machines and fixed robots, the latter commonly referred to as pick-and-place robots.

Indeed, in most modern factory installations, there is a need for an integration of mobile robots with pick-and-place robots in order to achieve a high degree of productivity. Such mobile robots may be highly intelligent devices incorporating central computers to allow the devices to perform such decisional tasks as avoidance of obstacles, the manipulation of objects with respect to loading and unloading areas, and radio communication control with central computers so as to receive and execute tasks as designated to them from the central computer. It is important that the mobile robot, sometimes referred to as X-Y conveyors (a name which has been given to them by the Sumitomo Machinery Corp. of America of Teterboro, N.J.), be capable of maneuvering in relatively close quarters over surface irregularities and changes in the slope of a floor as may be encountered by ramps used in factories. It is also important that such mobile bases be capable of moving on slick surfaces such as caused by oil spillages and grease.

Thus, the mobile base for use with robots must be a versatile device capable of movement in any planar direction and also able to maneuver in and around obstacles and surface irregularities without falling over. This latter problem is complicated by the fact that objects lifted by a mobile robot tend to change the center of gravity of the robot and effectively make the mobile robot less stable than it otherwise would be. It is therefore necessary that the mobile base or carriage system used for a mobile robot be capable of adapting itself to such changes in the center of gravity of the robot-load combination and thereby effectively and safely transport an object from one location to another.

Some of the factors that have been considered in the design of present mobile bases include: (1) the overall efficiency of the mobile base in terms of the length of time that it can operate before it requires recharging or refueling; (2) the ability of the mobile base to negotiate surface discontinuities; (3) the maximum grade that can be safely ascended or descended by a mobile robot when the mobile robot is either a load or no-load condition; (4) the ability of a mobile robot to operate when the floor surface is coated with grease, oil, mud, snow, or other slide-inducing material; (5) the ability of a mobile robot to operate on surfaces which are not "hard"; such as carpets, lawns, linoleum, and the like, as well as considerations as to whether the mobile base will damage or mar such surfaces; (6) the maximum load that the mobile robot is designed to carry; (7) the minimum passage width (such as a door) through which the mobile base must be able to pass; (8) the maximum speed and acceleration required by the mobile base; (9) whether the mobile base must operate without exhaust and whether noise limits are present; and (10) the temperature and humidity range in which the mobile robot is to operate; (11) the maximum vibration the mobile robot is to encounter; (12) other environmental factors which may affect the operation of the mobile robot; and (13) the cost and reliability of the mobile base.

The prior art has approached the implementation of mobile bases from several design philosophies, one of which is the tricycle carriage system shown in FIGS. 2A and 2B. In FIGS. 2A and 2B, the carriage system uses two independent drive motors to respectively power and steer the robot. The driven wheels are fixed parallel to each other, while the third wheel is free to pivot. Steering is accomplished by causing one of the driven wheels to rotate faster than the other. This allows relatively tight turns to be accomplished by powering one wheel in a forward direction and the other in a reverse direction.

A primary problem with this configuration is that steering can be erratic due to differences in traction and/or efficiency between the two driven wheels. This can be partially corrected by placing an angular position encoder on the pivot wheel to help sense the rate of turning. If a pivot encoder is used, care is generally required during reverse movement or differential pivots. Alternatively, a computer can be used to provide tight control of the speed to the drive motors. This can be accomplished through use of tachometers to each drive motor or by using synchronous motors such as brushless rare earth motors and/or stepping motors. Representative of such carriage systems are those manufactured by R. B. Robotics Corporation, of 14618 West 6th Ave., Suite 201, Golden, Colorado 80401.

Another variation of the tricycle carriage system powers only the pivot wheel while the other two wheels freely rotate. In this variation, steering is accomplished by a gear motor coupled to control the direction of the powered pivot wheel. This alternative is generally less expensive than the first mentioned dual-driven wheel variation and allows simpler steering control. The traction of this latter system, however, is less than that for the dual-driven version.

As will be discussed further in this description, carriage systems are required to be highly stable if they are to operate safely in an industrial environment. In particular, it is important that they not only be able to maneuver along a factory floor or the like but also that they be able to do so without tilting or falling over due to changes in direction, speed or floor tilting. Important considerations must therefore be made with respect to determination of the center of gravity, both in the unloaded and loaded configurations of the overall mobile robot. This in turn involves calculation of dynamic turning forces to ensure that not only is the mobile robot stable when loaded, but that it will remain stable even when acceleration forces associated with turning or changing of speed are encountered separately or simultaneously with respect to each other.

Another prior art carriage system that uses a triangle principle has been developed by the U.S. Veterans Administration as a transport device for paraplegic people, called the Omnichair ™. This carriage system is described in a publication entitled "Microcomputer Controlled Omni-Directional Mechanism for Wheelchairs" by W. H. T. La, T. A. Koogle, D. L. Jaffee, and L. J. Leifer, from the Institute of Electronic Engineers publication *Frontiers of Engineering in Health Care*, CH1621-2/81/0000-0326,1981, IEEE. This technique uses what is known as a "wheel within a wheel" with rollers positioned about the periphery of each of the three main wheels. One such main wheel is shown in FIG. 3A and three such wheels are shown in FIG. 3B as attached to the chair base. The chair can be turned by driving all three wheels together, and can be translated by driving two of the three wheels. This latter situation is shown via force vectors in FIG. 3C.

The present invention approaches a carriage system design from a different perspective; namely, a technique which uses a plurality of wheels, each oriented in the same direction at the same time and each allowed to change its direction under the unified control of a steering mechanism. Drive to each wheel is also simultaneously directed to the wheels by means of a separate drive train. In this way, only one drive motor and one steering motor are used in order to achieve a mobile carriage system operable in any direction.

An enhanced version of this carriage system further includes an extensible leg assembly for each wheel with the respective wheel mounted at the end of the leg assembly. The leg assemblies are unifiedly controlled by a single motor driving a chain which operates the rotation of each of the extensible legs. The steering chain simultaneously adjusts each of the wheels so that as the legs extend or retract, the wheel orientations are maintained, when the mobile base is in translation and thus movement in any direction can be maintained without compensating for the retraction or extension of the leg assemblies. This greatly simplifies the use of the carriage system as it approaches or leaves a narrow passageway such as associated with doorways and the like.

Furthermore, through use of single motors for each of the steering, driving and leg control functions, a higher degree of efficiency is attained than in other prior art devices. This efficiency is markedly better than prior art carriage systems which turn the entire base in order to make a turn. Here, only the wheels and turret associated with the base turn while the remainder of the carriage system does not turn, thereby greatly reducing the energy required to make turns. This energy saving is especially important in warehouse and other applications requiring turns to be made frequently.

In addition to the prior art noted above, a number of prior art patents are known which are relevant to the present invention. These references are presented in Table 1 below.

TABLE 1

|  | Inventor | Issue Date |
|---|---|---|
| U.S. Pat. No. | | |
| 3,642,088 | Smith | 1972 |
| 3,825,087 | Wilson | 1974 |
| 3,938,608 | Folco-Zambelli | 1976 |
| 3,972,379 | Norris | 1976 |
| 4,274,503 | Mackintosh | 1981 |
| Foreign References | | |
| West Germany | | |
| 2735071 | Thale | 1979 |
| The Netherlands | | |
| 6609100 | Klockner-Werke AG | 1967 |

Of these references, U S. Pat. No. 4,274,503, Mackintosh is of greatest interest since it discloses a power operated wheelchair having a drive motor 87 and a steering motor 43 as shown in FIG. 2 thereof. The steering motor drives a steering chain 77 which in turn controls the direction of six ground wheels 64 as best seen in FIGS. 3 and 7. The actual steering of each wheel is accomplished through direct turning of yoke 74 via shaft 73 and sprocket 76. This arrangement provides for changing the angular direction of each of the wheels simultaneously but does not provide for allowing the wheels to move about a short radius as a turn is effected at a stationary location as is done in the present invention. The present invention provides for actual rotation about each wheel's axle as a turn is generated so that the wheel does not shimmy along the surface upon which it is placed. The arrangement shown in Mackintosh does not provide for such rotation, and thus shimmying about the surface upon which the chair is placed apparently will occur if a turn is effected while the chair is not in translation. Such shimmying requires a great deal of energy, thus reducing battery recharging times and can result in marring of the floor surface as well as rapid wearing of the ground wheels 64.

Furthermore, the embodiment shown by Mackintock includes six peripherally placed ground wheels which limit the amount of purchase, that is surface area upon which the steering chain contacts the sprockets 76 associated with the ground wheels. By having limited purchase, there is the likelihood of slippage between the steering chain and the sprockets, especially if a turn is attempted without translation of the chair which would result in high frictional forces between the ground wheel and the surface of the floor. The present invention typically employs three or four ground wheels and provides for rotation of these wheels about their axes when turns are performed; thereby minimizing frictional contact with the floor and reducing energy usage. The use of three or four wheels instead of six also greatly increases the purchase between the steering chain and the steering sprockets, and this in turn is also increased through the use of idlers about which the steering chain passes which increases the purchase beyond that associated with placement of the steering wheel about the outer periphery of each of the steering sprockets as done in Mackintosh.

Furthermore, the enhanced embodiment of the present invention has extensible leg assemblies that provide greatly increased stability of the mobile base when the legs are in their extended position. Mackintosh does not disclose or suggest such extensible leg assemblies.

U.S. Pat. No. 3,972,379, Norris, discloses a hydrostatically driven utility vehicle where each wheel is separately driven and steered and where means are provided for steering any two wheels in unison. The steering is accomplished with rack and pinion gear assemblies, unlike the present invention, and no suggestion of extensible leg assemblies is made in this reference.

U.S. Pat. No. 3,938,608, Folco-Zambelli discloses a wheeled vehicle having a guide and traction wheel 8 which turns as the body of the unit is turned with reference to its frame. This type of drive and steering mechanism is unlike the present invention and also does not suggest the extensible leg assemblies disclosed in the present invention.

U.S. Pat. No. 3,825,087, Wilson discloses a motorized agricultural type carrier in which all four wheels of the carrier can be selectively powered and steered. The steering mechanism shown is unlike the present invention. This reference also does not disclose or suggest extensible leg assemblies.

U.S. Pat. No. 3,642,088, Smith discloses a self-locating vertically and facing adjustable seat for use in tractors. Although the tractor has driven and steering wheels, this patent is of lesser relevance than the above cited references and does not disclose extensible leg assemblies nor the particular technique used to drive and steer the wheels of the mobile base disclosed herein.

German Pat. No. 27 35 071, Thale shows in its drawings a mechanism for steering pairs of legs in the same direction at the same time with two pairs of legs being steered oppositely so as to allow the device to move in a smooth circle as shown in its FIG. 1. This technique for steering the wheels of the device is unlike the present invention although FIG. 3 does show a gear assembly for driving a single wheel which is similar in nature to the present invention. This reference also does not disclose extensible leg assemblies.

Finally, Netherlands Pat. No. 6609100 shows a tricycle type power vehicle with apparent steering of the front wheel 8. This type of vehicle does not disclose or suggest the carriage system of the present invention with uniformly driven and steered legs and extensible leg assemblies.

Therefore, it is submitted that the prior art references, taken alone or in combination with each other, do not disclose or suggest the mobile base of the present invention, including the embodiment using extensible leg assemblies. Copies of the patent references cited will be submitted to the Patent and Trademark Office.

DISCLOSURE OF THE INVENTION

A mobile base (carriage system) is described which uses three or more wheels that are mechanically synchronized to each other for both steering and rotation. The preferred embodiments of the present invention obtain synchronization of both steering and power (power will be used herein to denote the driving of the wheels rotationally about their axes so as to cause movement of the carriage system along the surface upon which it is placed) through use of chains. A housing or steering tube of each foot assembly is driven by a steering chain. Through this technique, the wheels steer together, and therefore the base of the carriage system maintains its rotational orientation as it executes a turn. Due to this mechanism, the upper torso of a robot placed upon the carriage system (which would typically contain the vision and ranging systems) can be pivoted and mechanically linked to the steering chain. Very precise controlled turns of the carriage system can be accomplished by driving the steering chain with an accurate servo motor and an associated gear reducer as will be explained in the detailed description. Since the carriage system base does not turn when a turn is made, significant energy savings are realized as compared to carriage systems with bases that turn under similar circumstances.

The power shaft associated with each foot assembly drives the axle emanating from the wheel by means of a pair of miter gears. It is preferable that the radius between the center of the power shaft and the wheel form a ratio with the radius of the wheel equal to that of the gear ratio of the miter gears and thereby cause the wheel to traverse a distance equal to the circumference of the steering circle (on the ground) when the power shaft is maintained in a stationary position with only the steering tube turned through 360°. This preferable radius ratio minimizes wobble of the carriage system when a change in directed is effected while the carriage system is stationary.

The second version of the present invention incorporates extensible leg assemblies associated with each foot assembly so as to provide additional stability to the carriage system when desired. Each leg assembly is simultaneously controlled by a chain which provides for extension and retraction of the leg assembly simultaneously. In this manner, the carriage system can be moved through relatively narrow locations with the legs retracted while at other times the legs can be extended to provide additional stability, especially when the associated mobile robot is carrying a load which otherwise offsets the carriage system's center of gravity. This version of the present invention provides for similar steering and driving chain relationships as described for the non-extensible version of the synchro-drive carriage system. Extension and retraction can be performed with or without translation of the carriage system.

OBJECTS OF THE INVENTION

It is therefore a principal object of the present invention to provide a mobile base or carriage system for mobile robots and the like which provides for simultaneous driving and steering motion to each wheel associated with the carriage system and with such steering to allow rotation of the wheels even when no translation of the carriage system is present.

Another object of the present invention is to provide a carriage system of the above description in which a first power source provides power for steering each of the wheels simultaneously, and a second power source provides power for axially turning each wheel simultaneously A still further object of the present invention is to provide a carriage system of the above description in which transfer of power from the power sources to the foot or wheel assemblies associated with each wheel is provided by two endless chains for the steering and power functions respectively.

A still further object of the present invention is to provide a carriage system of the above description further comprising extensible leg assemblies associated with each wheel assembly so as to increase the zone of stability for the carriage system when the legs are extended outwardly from the carriage system.

Another object of the present invention is to provide a carriage system of the above description with extensible leg assemblies in which drive power, steering power, and extension-retraction power for each wheel assembly is accomplished through associated endless chains which are in turn driven by single power sources.

A still further object of the present invention is to provide a carriage system with extensible leg assemblies that maintain wheel orientation between retraction and extension when the carriage system is in translation and achieves the same wheel orientation by turning the wheel through circles when extension or retraction is performed without translation.

Another object of the present invention is to provide a carriage system that does not revolve the carriage base in order to change direction; thereby increasing the efficiency of the carriage system as compared to systems that rotate the carriage base to make turns.

Other objects of the present invention will in part be obvious and will in part appear hereinafter.

THE DRAWINGS

For a fuller understanding of the nature and objects of the present invention reference should be made to the following detailed description taken in connection with the accompanying drawings, in which:

FIG. 2A is a diagrammatic top plan view of a prior art carriage system showing placement of its wheels and its normal center of gravity (NCG);

FIG. 2B is a diagrammatic side elevational view of the carriage system shown in FIG. 2A;

FIG. 3A is an enlarged side elevational view of a wheel assembly used in another prior art carriage system, the wheel assembly having rollers placed about the periphery of a hub so as to form an overall wheel;

FIG. 3B is a diagrammatic top plan view of a carriage system using the wheels shown in FIG. 3A;

FIG. 3C is a force diagram showing how a resultant movement in the forward ($F_Y$) direction can be obtained by simultaneous rotation of the wheels associated with motors 2 and 3 in FIG. 3B;

FIG. 15 is a top plan view of the carriage system in a second embodiment of the present invention having extensible leg assemblies such as shown in FIG. 1, illustrating the placement of the steering motor, drive motor, and retraction motor associated with this carriage system as well as placement of the chains, idlers, potentiometer, microswitches and batteries.

FIG. 16 is an enlarged partially broken away perspective view of a leg assembly used in the carriage system shown in FIG. 15;

FIG. 17 is a cross-sectional diagrammatic view of the leg assembly driven by the steering motor shown in FIG. 16;

FIG. 18 is a side, partially cross-sectional view of the center shaft shown in FIG. 15, illustrating how electrical power and communication information is transferred between the components on the carriage system base to the upper torso of a robot placed upon the carriage system as shown in FIG. 1;

FIG. 19 is an enlarged side elevational view of the drive motor and gear box shown in FIG. 15;

FIG. 24A is a diagrammatic top plan view of the carriage system and turret with the leg assemblies in their extended position and showing the rotational direction of retraction with the carriage system in translation;

FIG. 24B is a diagrammatic top plan view similar to FIG. 24A showing the leg assemblies retracted and illustrating rotational movement of the base and alignment of the turret and wheels corresponding to their preretraction orientation;

FIG. 25A is a diagrammatic top plan view of the carriage system and turret similar to that shown in FIGS. 24A and 24B, illustrating the wheel, base and turret orientations when the leg assemblies are fully extended and fully retracted while the carriage system is not in translation; and FIG. 25B is a diagrammatic representation of the path of any wheel as a leg retraction is performed without the carriage system in translation, thus corresponding to the paths of the wheels shown in FIG. 25A.

BEST MODE FOR CARRYING OUT THE INVENTION

Figure 4:
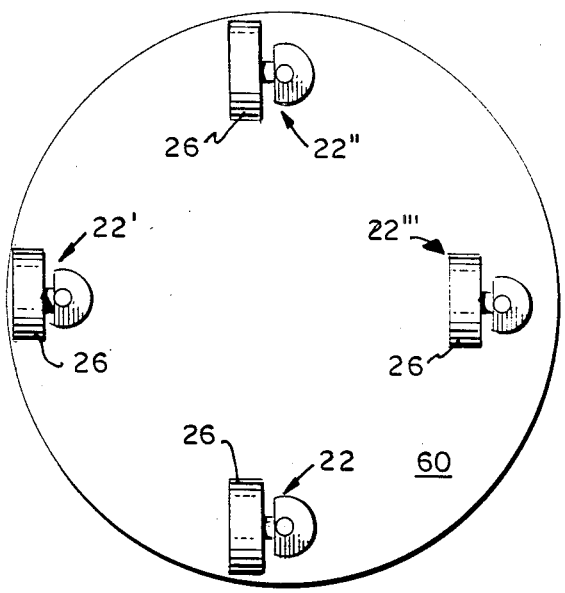
FIG. 4, is a bottom plan view of the base and wheels of a first embodiment of the present invention.
Figure 5:
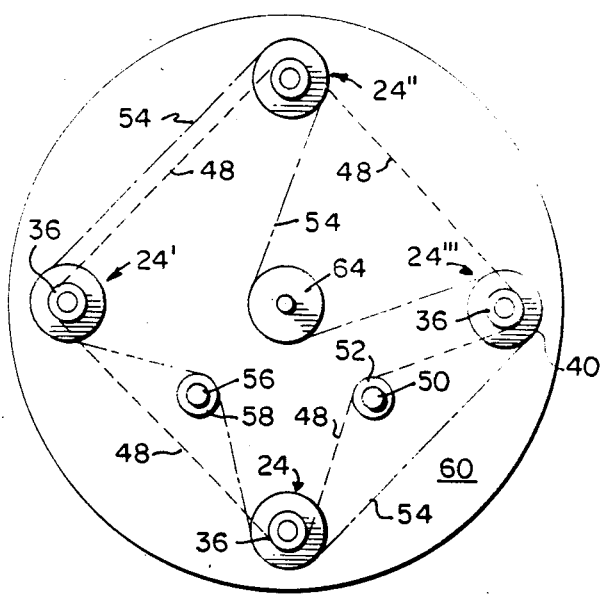
FIG. 5 is a top plan view of the carriage system base shown in FIG. 4.
Figure 6:
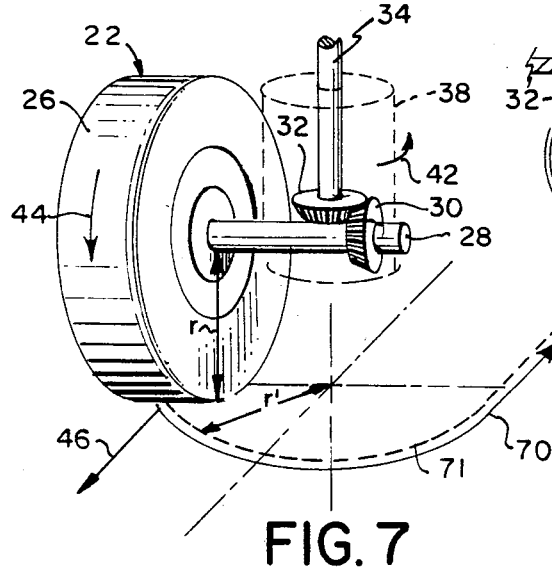
FIG. 6 is an enlarged partial cross-sectional view of the wheel assembly used in the carriage system shown in FIGS. 4 and 5.
Figure 7:
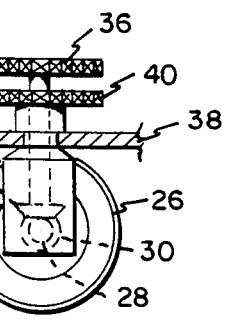
FIG. 7 is an enlarged perspective view of the wheel assembly shown in FIG. 6 illustrating how a wheel rotates about its axis as the wheel changes direction.

As best seen in FIGS. 4 and 5, a synchro-drive mobile base 20 (carriage system and mobile base are used synonymously) comprises a plurality of foot assemblies 22, 22', 22" and 22''', each including a wheel 26, an axle 28, miter gears 30 and 32, a power shaft 34, a power shaft sprocket 36, a steering tube or housing 38, and a steering tube sprocket 40. As can be seen in FIGS. 5, 6 and 7, rotation of power shaft 34, such as in the direction of arrow 42, causes rotation of miter gear 32 which in turn imparts rotation to miter gear 30 turning axis 28 so as to rotate wheel 26 in the direction of arrow 44. Translation of the wheel, if steering tube 38 is maintained in a stationary position, is then in the direction of arrow 46. As seen in FIG. 4, a chain 48 is positioned about each power shaft sprocket 36 so that each wheel is simultaneously driven in the same direction upon movement of chain 48 by drive motor shaft 50 and its associated drive sprocket 52. A motor (not shown) turns the shaft 50. The motor is supplied with electrical power, typically from a battery mounted within the carriage system.

The orientation of each wheel 26 is similarly controlled by movement of steering chain 54 which is positioned about each of the steering sprockets 40. The chain is driven by a steering motor shaft 56 and its associated steering motor sprocket 58. Since each steering sprocket 40 receives the same angular displacement for a given movement of steering chain 54, the orientation of each wheel on the carriage system is maintained since the wheels are all installed in the same orientation. Therefore any desired change in direction can be achieved by simply controlling the angular rotation of the steering motor shaft 52.

Figure 8:
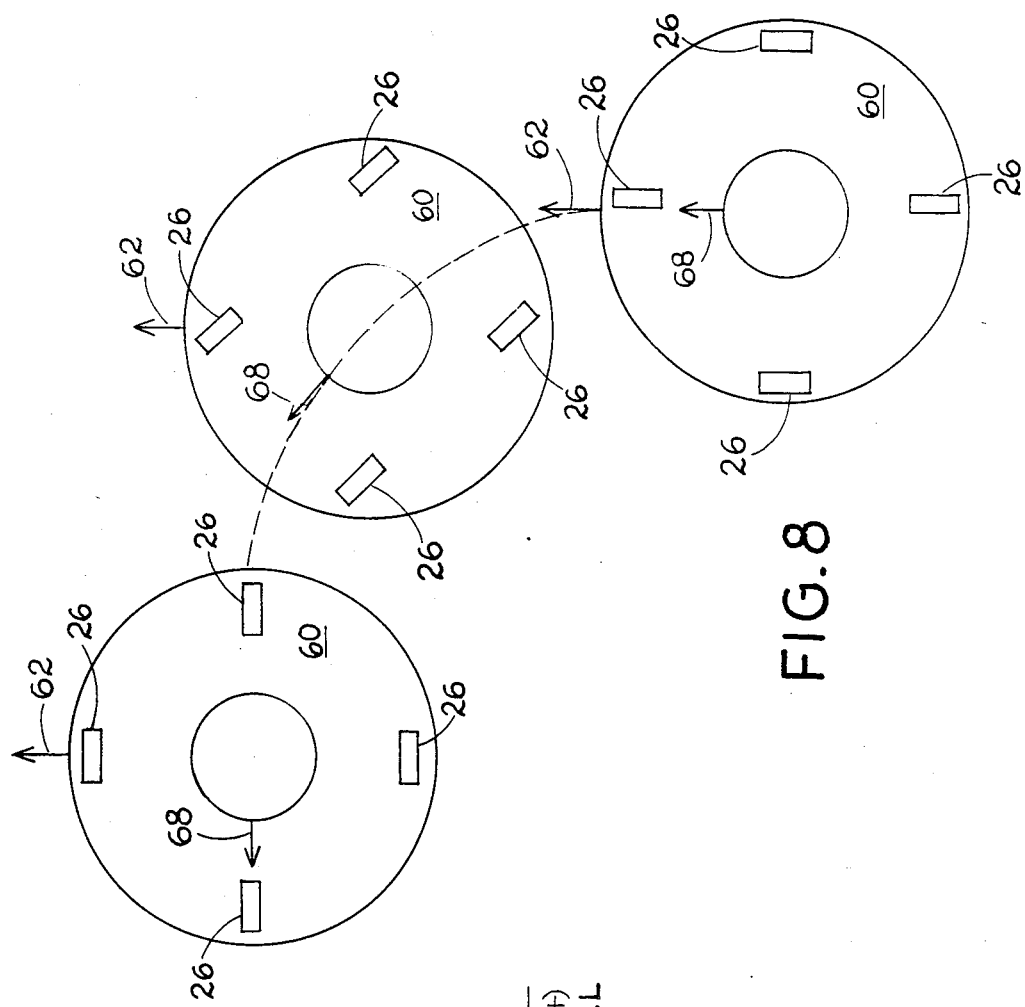
FIG. 8 is a series of diagrammatic representations of a carriage system shown in FIGS. 4 and 5 illustrating the orientation of the wheels and of the carriage base and turret associated with the carriage system as a turn is made.

Since the wheels of the mobile base steer in synchronism, base 60 of the mobile base does not change its rotational orientation with respect to the surface upon which it is placed as the mobile base executes a turn. This is shown diagrammatically in FIG. 8 as the carriage system makes a 90° turn in the counterclockwise direction as viewed from above. Orientation arrow 62 shows that the carriage system has indeed maintained its orientation with respect to the surface upon which it is placed as this turn is executed.

Because of this characteristic of the carriage system, the upper torso 61 of a robot (see FIG. 1) placed upon the carriage system can be pivoted and thus mechanically linked to the steering chain 54 by means of torso rotation sprocket 64 interconnected to the steering chain 54 as shown in FIG. 5. The sprocket thus imparts rotation to the torso shaft 66 thereby providing that the torso orientation as depicted by arrow 68 in FIG. 8 rotates as the carriage system undergoes a rotational change. This allows the vision and ranging systems 63 (see FIG. 1) which are normally associated with the upper torso of the robot to be directed to the instantaneous direction of the carriage system. By not rotating the carriage system base 60 as a turn is executed, a considerable amount of energy is saved due to the rotational inertia of the base. Typically the carriage system base and components (including batteries) can weigh over 200 seconds (90.71 kilograms) and by not rotating this mass as a turn is made, rotational energy is conserved. Such energy conservation is especially important when the carriage system is used in a warehouse or other application requiring many turns.

As best seen in FIG. 7, miter gear 30 is positioned on the opposite side of power shaft 34 with respect to wheel 26. This placement of the miter gear is due to the interplay between the steering and the wheel drives. If the power chain 48 is stationary (that is, the carriage system is not moving) and if the steering chain 54 is turned by driven sprocket 58, the steering chain causes the wheels 26 to roll without slippage as the wheels move once around center line path 71 if the gear ratio for gears 32 and 30 is in the same ratio as the wheel radius r and inner path pivot radius r'. This is mathematically stated as:

gear ratio $A/B = r'/r$ where A is the number of teeth on gear 32 and B is the number of teeth on gear 30.

If the pivot radius r' is less than the wheel radius r, the carriage base will undulate slightly as such a steering operation is performed. If this is objectionable in a particular installation, the miter gears 30 and 32 can be selected to have a ratio equal to the ratio of the circumferences of the two circles associated with radii r and r'. In the preferred embodiment of the present invention, gear ratio $A/B = 1$ and thus the radius of wheel 26 is selected to be the same as inner path radius r'.

This wheel assembly arrangement is different from the yoke arrangement disclosed in U.S. Pat. No. 4,274,503, Mackintoch. There, although the wheels are steered in unison, they each pivot at one location on the floor surface if the carriage system is not in translation as a turn is executed. Such turning without wheel rotation can easily mar a floor surface and increase the wear of the wheels. The present invention obviates this problem in the prior art. The present invention also uses much less energy to make such a turn as compared to Mackintosh since friction with the floor surface is greatly reduced by the wheel rotation.

In order to ensure that the drive chain 48 and the steering chain 54 have enough contact with their associated drive and steering gear sprockets 40 and 36 respectively (such a contact area between a gear and a chain is known in the art as "purchase"), idlers can be incorporated to force the chain to form a more acute angle with the associated sprocket. This will be described more fully with respect an enhanced embodiment of the present invention presented below.

The carriage system shown in FIGS. 4–7 has been found to be exceedingly simple to control, to have fairly good efficiency with respect to motive power consumption, has relatively good traction, has excellent maneuverability, excellent navigation, but has only fair stability and climbing ability due to the wheels being non-projected with respect to the base 60.

The reason for desiring greater stability for a carriage system than that embodied in the above version of the present invention can best be understood following a review of the carriage system stability as presented in the next section.

Stability of a Carriage System

In order to determine the stability of a carriage system with an associated robot thereon, it is necessary to determine the composite center of gravity for the carriage system and robot. The center of gravity (technically referred to as the center of mass) is in essence the location where an object can be balanced at a point. Mathematically, it can be defined by a vector R emanating from the origin of a reference frame whose magnitude and direction are given by the equation:

$$\vec{R} = \sum_{i=1}^{N} (m_i \vec{r}_i)/M$$

for a group of particles, of total mass M; and by $$\vec{R} = \int \frac{\vec{r} \, dm}{\int dm}$$

for a solid homogeneous object of total mass M. (See *Classical Mechanics,* Goldstein, p. 5, Second printing July, 1981. Addison-Wesley Publishing Co. Inc.).

The vertical component of the center of gravity is merely the height of this balance point, while the "normal center of gravity" (sometimes abbreviated NCG) is the projection of this point onto a surface upon which the object is placed. Various mathematical techniques can be used for determining the center of gravity, including its vertical component and its normal component. One computer program which performs such calculations is identified as CG.BAS, a program by written by applicant in the C-BASIC ™ language (Digital Research Inc.) for use on computers operating under the CP/M ® operating system (CP/M is a registered trademark of Digital Research, Inc., Pacific Grove, Calif. 93950.)

The determination of overall stability in addition to requiring knowledge of the carriage system-robot combination center of gravity also requires knowledge of both the static and dynamic stability. A computer program that makes such determinations is presented at pages 259–262 of *Basic Robotics Concepts* and is also hereby incorporated by reference.

Figure 9:
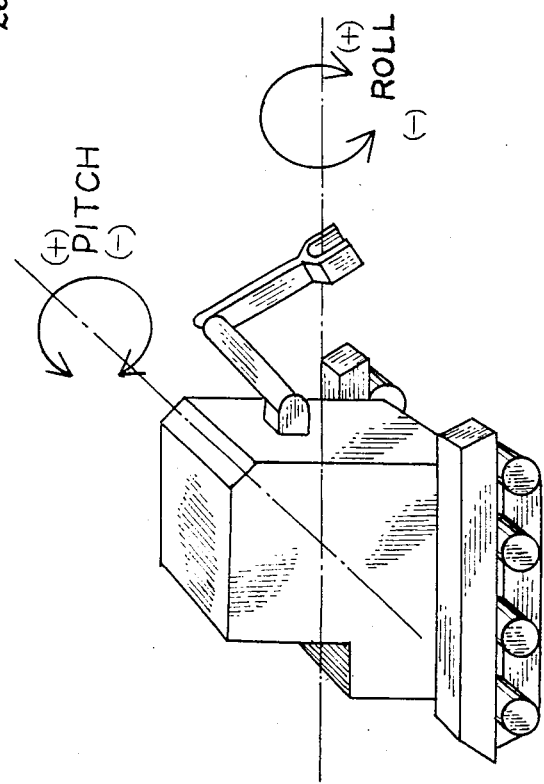
FIG. 9 is a perspective diagrammatic representation of a mobile robot used to define roll and pitch.

In the following discussions the term "pitch" is used to describe the angle of deviation from level along the axis of motion as best seen in FIG. 9, while the term "roll" describes the angle of tilt relative to level in a plane normal to the direction of motion. Positive pitch is defined as a "nose-up" attitude, while positive roll is described as a tilt to the left with respect to the forward direction of the carriage system.

Figure 10A:
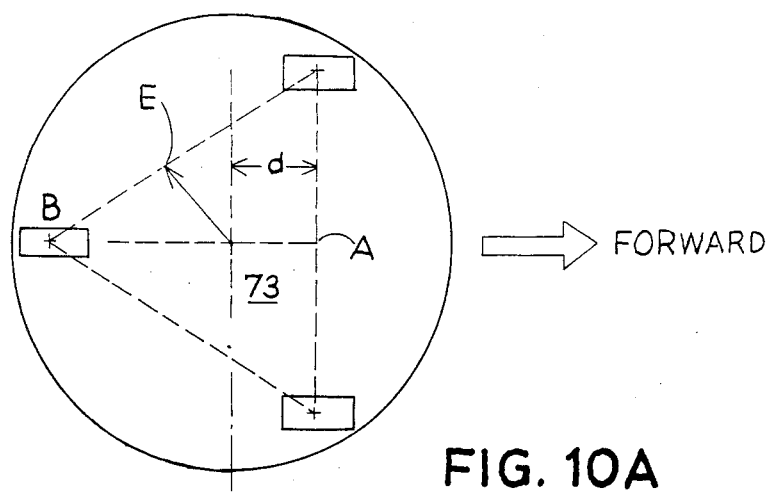
FIG. 10A is a diagrammatic top plan view of a carriage system base illustrating the zone of stability and the direction where tipping can most easily occur with respect to the carriage system.

In determining the static stability of a carriage system or any other object, reference is usually made to what is called the "zone of stability" as shown diagrammatically in FIG. 10A. The zone of stability 73 is simply the area bounded by lines drawn between the support points which, for carriage systems, are typically the wheels at the point they contact the floor or ground. It is usually desirable to arrange for heavier components of the carriage system (such as motors, batteries and gear boxes) so that their combined center of gravity is directly over the center of the zone of stability.

Figure 10B:
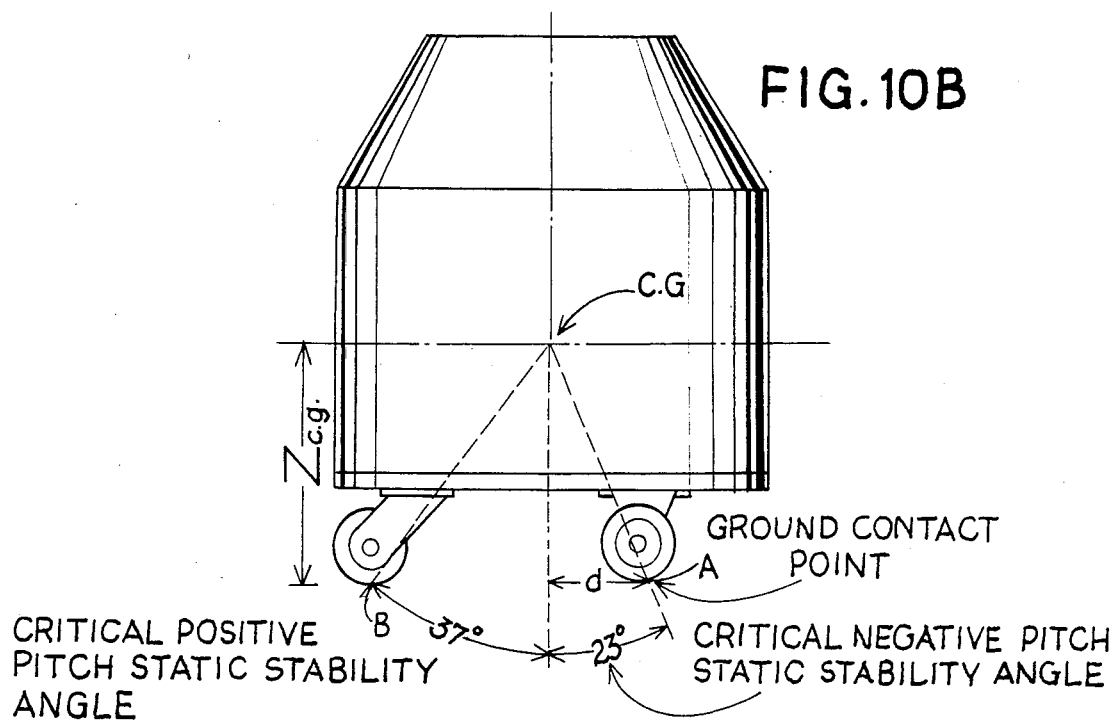
FIG. 10B is a side elevational view of a typical carriage system illustrating the positive and negative static stability angles.

Once the zone of stability and location of the center of gravity are determined, the "critical static pitch angles" can be determined by drawing a line from the center of gravity straight forward and backward to the intersection with the edge of the zone of stability. This is shown by points A and B in FIG. 10A. The critical static pitch angles can be determined graphically as shown in FIG. 10B or through use of the following equation:

$$\theta = \arctan(d/Z_{cg})$$

where $\theta$ is the critical stability angle $Z_{cg}$ is the height of the center of gravity d is the distance (in the direction of interest) from the normal center of gravity (NCG) to the edge of the zone of stability.

The critical static positive pitch angle is the maximum incline that the carriage system-robot combination can stand on without tipping over backwards. Conversely, the critical static negative pitch angle is the maximum slope that the carriage system-robot can stand on facing downward without falling over. The same process can be used to find the critical static roll angles, taking the into account the worst case conditions for the number of wheels used. Thus, in a tricycle carriage system such as shown in FIGS. 10A and 10B, the worst case is when the carriage system-robot combination is represented by pitch and roll at the safe time, caused by a slope in the direction of point E.

A carriage system-robot combination can drive up or down a ramp very nearly equal to its critical static pitch angle provided it remains at a constant speed. If, however, the mobile robot is driving down a steep ramp and attempts to slow down or conversely, to accelerate while climbing a steep ramp, it may still fall over even though the static pitch angle has not been exceeded. Due to this potential problem, the carriage system-robot combination should be stable at angles considerably worse than those that it is actually expected to negotiate.

The force that acts on an object such as a mobile robot is the result of longitudinal acceleration or deceleration as given by the following equation:

$$F = M*a$$

where:

F is the resultant force (in pounds or Newtons),

M is the total mass of the mobile robot (in slugs or kilograms, whereat sea level one slug equals an object's weight in pounds divided by 32) and a is the acceleration in feet per second per second or meters per second per second.

The resultant force can be shown as a single force pushing in the direction opposite to the acceleration of the mobile robot along a line running through the center of gravity of the mobile robot. This is shown diagrammatically in FIG. 11, where in the worst case shown, the force (Fd) is due to deceleration and is acting to keep the mass of the mobile robot in motion. This force is typically known as inertia. Since the braking action is occurring at the ground contact points, the inertia force can be shown to be a moment acting at a distance equal to the height of the center of gravity ($Z_{cg}$). This moment of inertia is acting to cause the mobile robot to rotate forward along the arc 76 shown in FIG. 11 between its front wheels. The only force that can keep this moment of inertia from tipping the mobile robot is the moment acting through moment arm Dcg due to the force of gravity (Fg) acting through the mobile robot center of gravity. This force (Fg) thus acts on the other side of wheel 26. It should be noted that as the mobile robot begins to tip forward, the moment arm Dcg begins to shorten, thereby reducing the moment of inertia acting in the counterclockwise direction and thereby allowing the mobile robot to tip over more readily. It is therefore obvious that the lower the value of $Z_{cg}$, the less likely the mobile base will tip over if there is any tilting of the carriage system.

Figures 11, 12:
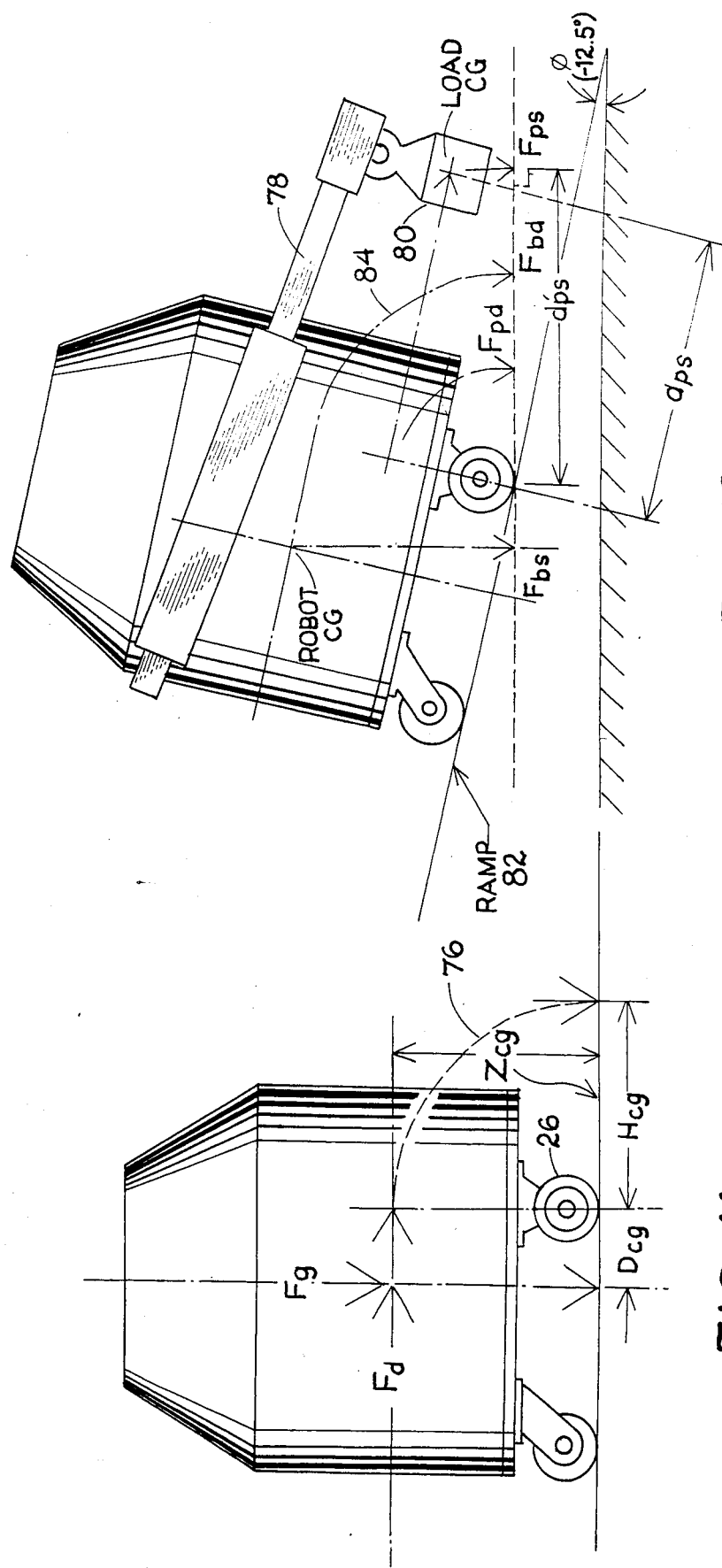
FIG. 11 is a side elevational view of a typical carriage system illustrating dynamic stability on a flat surface.
FIG. 12 is a side elevational view of a typical carriage system illustrating dynamic stability for a mobile robot carrying a load when it is operating on a slanted surface or ramp.

In order to better conceptualize this problem, FIG. 12 illustrates a typical mobile robot equipped with an arm 78 carrying a load 80 down a ramp 82. The net moment of inertia tending to rotate the mobile robot forward is thus the sum of the static and dynamic moments of inertia of the load and the dynamic moment of inertia for the mobile robot. If the sum of these moments is greater than the static moment of the body, the mobile robot will tip over in the direction of arc 84. The slope of the ramp is taken into account with respect to these moments as a modification of the static moment of inertia distances. By determination of these distances, the determination of stability is straightforward. This particular method, however, is complicated when a general consideration of a mobile robot executing a turn on a grade is considered.

Figure 13:
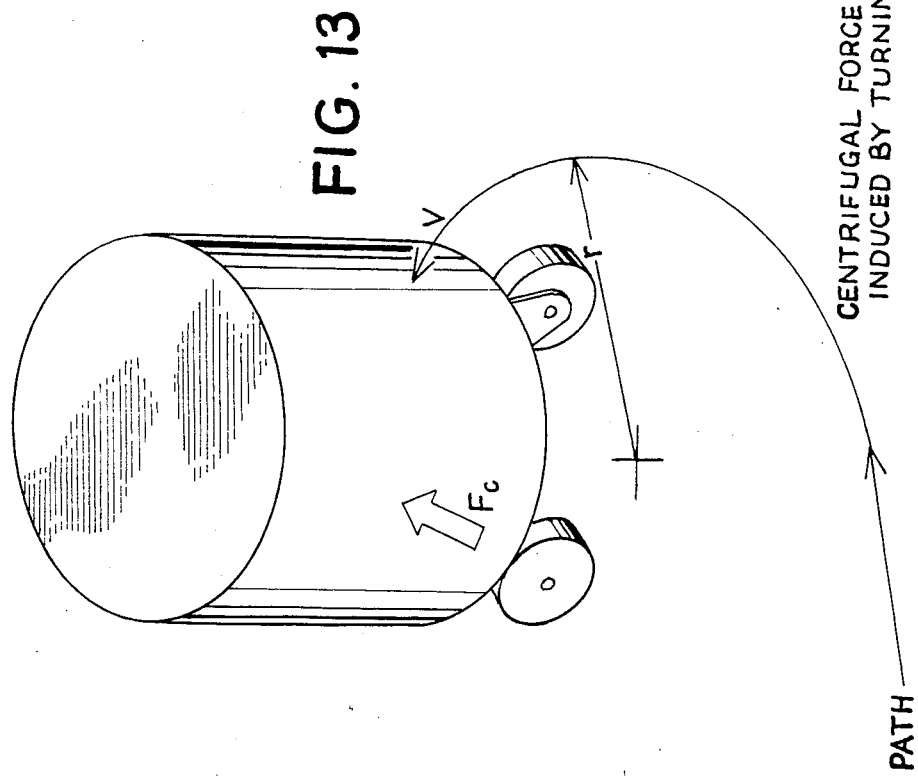
FIG. 13 is a perspective diagrammatic representation of a typical carriage system illustrating centrifugal force induced by turning.

The effect of turning generates what is known as a dynamic turning force that must be taken into consideration. Thus, as shown in FIG. 13, a mobile robot is shown moving at a constant velocity v in an arc having a radius r. Although the magnitude of its velocity is not changing, the direction of its velocity is changing, and thus the robot is undergoing centrifugal acceleration. Each mass of the mobile robot thus experiences a force normal to the direction of motion which is thus perpendicular to the tangent of the direction of motion at any instant. The equivalent acceleration and the net force acting on the center of gravity of the mobile robot as a result of this acceleration is given by the following equations:

$$Ac = v^2/r$$

and $$Fc = (m*v^2)/r$$

where
 Ac is the equivalent centrifugal acceleration,
 Fc is the centrifugal force induced by turning,
 m is the mass of the mobile robot in pounds/32 or kilograms,
 v is the longitudinal velocity in feet/second or meters/second, and
 r is the radius of turn in feet or meters.

Figure 14A:
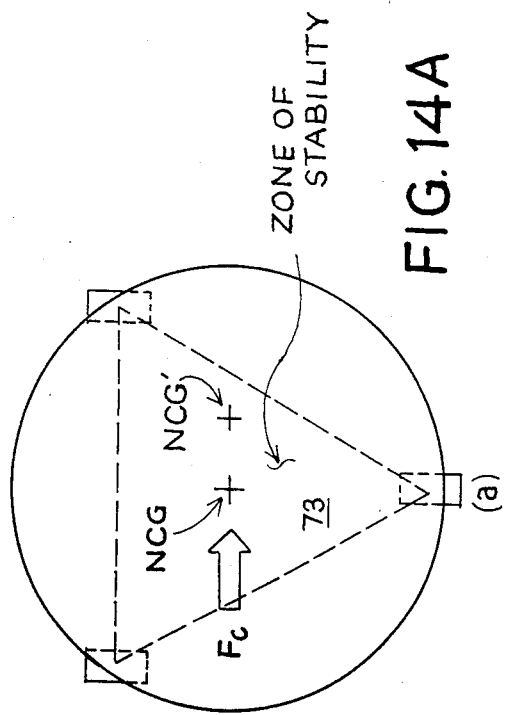
FIG. 14A is a top plan diagrammatic view of a typical carriage system illustrating the normal center of gravity (NCG) and movement of the normal center of gravity (NCG') due to a force $F_c$.
Figure 14B:
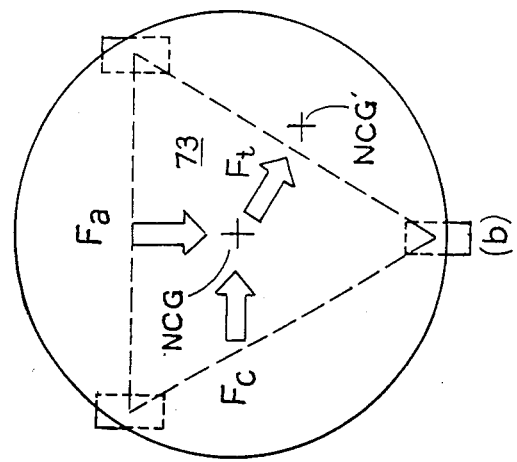
FIG. 14B is a top plan diagrammatic view of a typical carriage system similar to that shown in FIG. 14A, illustrating movement of the normal center of gravity (NCG') due to a combination of forces $F_a$ and $F_c$.

As illustrated in FIG. 14A, for a constant velocity turn, the result of such deflection moves the transposed normal center of gravity (now NCG') to a new location within the zone of stability. If, however, the mobile robot begins to accelerate a new force Fa acts on the robot as described earlier. The forces Fa and Fc then produce an equivalent force Ft as shown in FIG. 14B. The magnitude of this equivalent force is simply equal to the square root of the sum of the squares of the two contributing forces and may, depending upon the amount of acceleration, be sufficient to deflect the normal center of gravity (NCG') outside the zone of stability and thus the mobile robot would tip over in that direction.

With these considerations in mind, it is readily evident that in order to ensure that a mobile robot is stable when operating on ramps or executing turns, it is desirable to increase the zone of stability by extending the wheels of the carriage system outwardly from the center of gravity. However, if a carriage system employs such legs in a permanent configuration, it is unable to maneuver in close quarters. Due to this problem, the present invention in its modified embodiment further comprises extensible leg assemblies which simultaneously extend to allow greater stability and simultaneously retract to maneuver through tight or narrow quarters.

Figure 1:
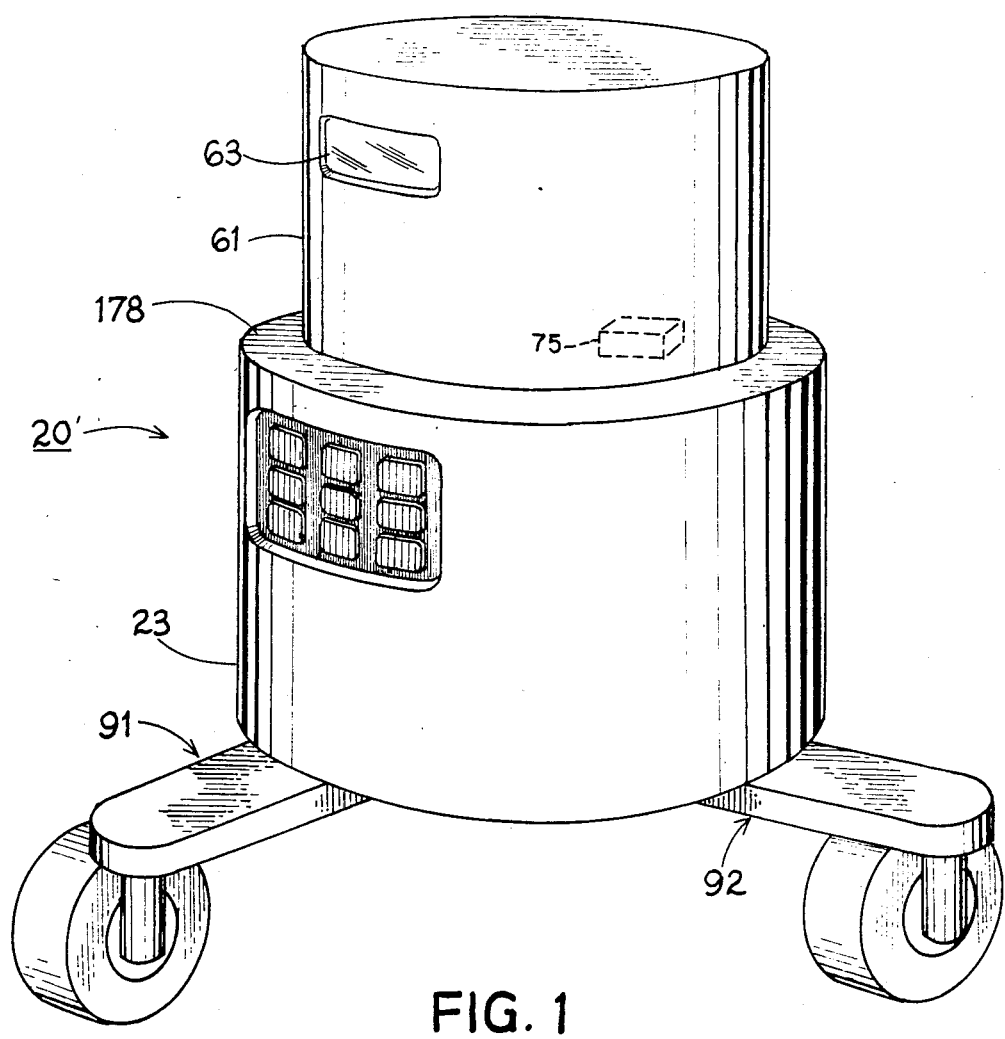
FIG. 1 is an overall perspective view of the mobile base (carriage system) with extensible leg assemblies, further showing in perspective view a housing or turret of a robot placed thereon so as to form an overall mobile robot.
Figure 20:
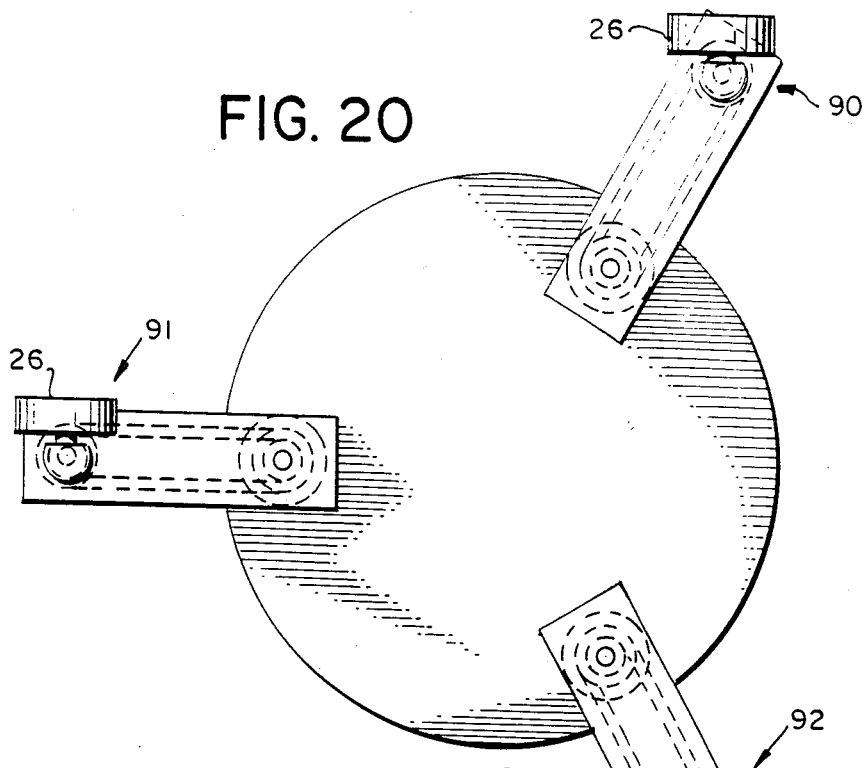
FIG. 20 is a diagrammatic bottom view of the carriage system shown in FIGS. 1 and 15 with the leg assemblies in their extended position.
Figure 21:
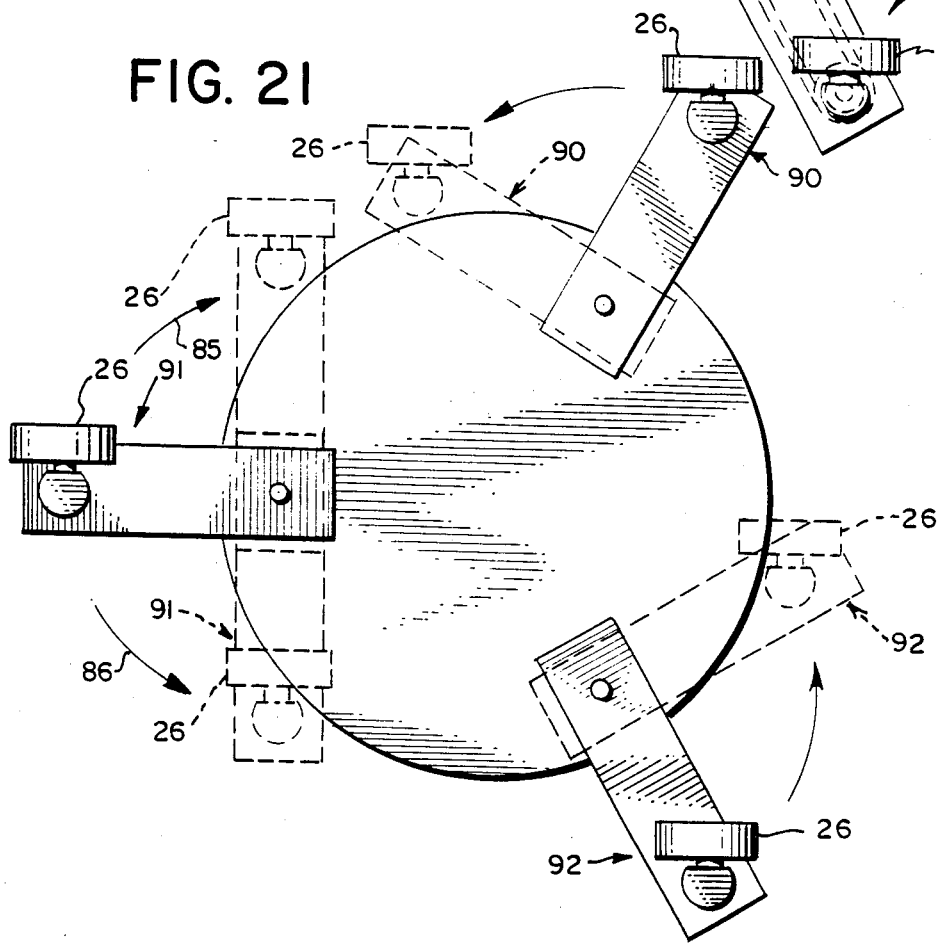
FIG. 21 is a diagrammatic bottom view of the carriage system shown in FIGS. 1, 15, and 20 illustrating movement of the leg assemblies in either the counter-clockwise or clockwise direction.

As best seen in FIGS. 1 and 15, the mobile base 20' of the alternative embodiment of the present invention incorporates not only those elements previously recited with respect to the embodiment shown in FIGS. 4–7, but also leg assemblies 90, 91 and 92 which can be extended outwardly as shown in FIGS. 1, 15 and 20 or pivoted inward as shown in phantom in FIGS. 21, 24A and 25A. When in the extended position, wheels 26 are farther away from mobile base's center of gravity, and therefore the zone of stability for the mobile base is increased for the reasons presented in the above subsection entitled "Stability of a Carriage System."

Diagrammatic representation of leg assemblies 90, 91 and 92 is presented in FIGS. 16 and 17 for both the driven end 93 and the distal wheel assembly end 97. Detailed views of driven end 93 and distal end 97 are presented in FIGS. 22 and 23. Chain 94 connects between lower drive sprocket 95 and wheel drive sprocket 96 so as to provide axial movement of wheel 26 by means of shaft 34 and the gear interrelationship such as shown in FIG. 7 by miter gears 30 and 32 for the previous embodiment of the present invention and also shown in FIG. 23. Sprocket 95 is driven by power chain 48 as best seen in FIGS. 15 and 17. As shown in FIG. 17, chain 48 interfaces with power drive sprocket 36 which is connected by a drive cylinder 98 to sprocket 95.

Similarly, steering of wheel 26 is provided by turning wheel steering sprocket 104 through chain 106 which in turn is driven by lower steering sprocket 109 as seen in FIGS. 16, 17, 22 and 23. The steering chain 54' as shown in FIGS. 15 and 17 is in turn driven by steering drive sprocket 40' as shown in FIG. 17. This steering drive sprocket is only associated with leg assembly 92 shown in FIG. 17 while the steering drive sprockets 40" associated with leg assemblies 90 and 91 are driven by drive chain 54'. As shown in FIG. 17, the steering drive sprocket 40' is turned by means of steering motor 108 through gear reducer 110. The motor is attached to the carriage system sidewall 23 by bracket 81.

FIG. 17 also shows that steering tube 38' is positioned with respect to chain 106 and steering shaft 112 so that all three wheels for leg assemblies 90, 91 and 92 are aligned with each other. This is shown in more detail in FIG. 22 where it is seen that lower steering sprocket 109 is positioned on shaft 112 by means of key 111 and set screw 115. Steering shafts 112 for leg assemblies 90 and 91 each have a tapered section 113 so that steering drive sprocket 40' can be press-fitted and aligned thereon. This allows each wheel 26 to be properly oriented with respect to each other.

The three leg assemblies are rotated outwardly and inwardly in the direction of arrow 85 or 86 as shown in FIG. 21 by turning leg assembly retraction sprocket 114 for each of the three leg assemblies. As seen in FIG. 21, wheels 26 maintain the same orientation throughout retraction or extension of the leg assemblies due to turning of chain 106 and thus rotation of wheels 26.

As best seen in FIGS. 24A and 24B, the leg assemblies 90, 91 and 92 can be extended or retracted while the carriage system 20 is in translation as shown by arrow 41. As such a retraction or extension is made, each wheel pivot point 37 maintains its spatial relationship with respect to the base 60 along corresponding radial lines 39, 39' and 39". As illustrated by imaginary point A on base 60 and imaginary point B on upper torso 61, as such an extension or retraction is made the base 60 moves angularly along an angle theta ($\theta$) after a retraction is made such as shown in FIG. 24B. The angular movement of the base is in a direction so as to allow pivot points 37 to remain aligned with radial lines 39. In this manner the orientation of wheels 26 is maintained throughout the retraction or extension operation. This uniform orientation of the wheels during extension or retraction is obtained by turning lower steering sprockets 109 in each leg assembly (see FIGS. 17 and 22) due to the angular movement of the legs as they rotate with respect to the base 60.

Since the upper torso 61 maintains its orientation to the floor corresponding to the direction of the wheels 26, the upper torso as shown by point B maintains its directional orientation during an extension or retraction of the leg assemblies. This is particularly important since in a translation motion the sensors 63 (see FIG. 1) associated with the upper torso for vision and other parameters are normally positioned in the direction of motion and should not turn when the base makes an angular movement due to retraction or extension of the leg assemblies.

As shown in FIGS. 25A and 25B, the present invention also allows extension and retraction of the leg assemblies while the carriage system 20 is stationary with respect to the floor surface. This is accomplished by commanding the base to turn in place, while driving the retraction system. When the legs have retracted/extended to the desired position, the steering drive is continued until it reaches the next complete turn and is then halted. Control electronics 75 (see FIG. 1) connected to tachometer 124 (see FIG. 22) and other sensors through slip ring 180 (see FIG. 18), actually determine when the wheels have completed the turn. Again the wheel pivot points 37 move radially inwardly or outwardly along radial lines 39, 39' and 39'' for leg assemblies 90, 91, and 92 respectively. Similarly, base 60 undergoes an angular displacement, theta, equal to that for the translational retraction of extension of the leg assemblies.

The wheels (as shown in FIG. 25A) actually make multiple turns in a helical type path 105 as shown in FIG. 25B when a retraction or extension of the leg assemblies is undertaken in this fashion.

Path 105 shows the direction of movement for a retraction. The direction of movement for an extension is the same path but with the arrows in the opposite direction. By undergoing the helical path 105 in an extension or retraction, slippage with respect to the wheels and the floor is minimized, therefore greatly increasing the efficiency of the system and also minimizing marring of the floor surface. It has been experimentally found that three complete circular paths as shown by path 105 made by each wheel are sufficient in an extension or retraction movement when the base is not in translation.

As shown in FIG. 25A, a point A on the base undergoes an angular displacement with respect to the floor equal to the angle theta when a retraction or extension is made, while a point B on the upper torso maintains its same orientation with respect to the floor surface since the starting and stopping orientation of wheels 26 is the same.

Figure 22:
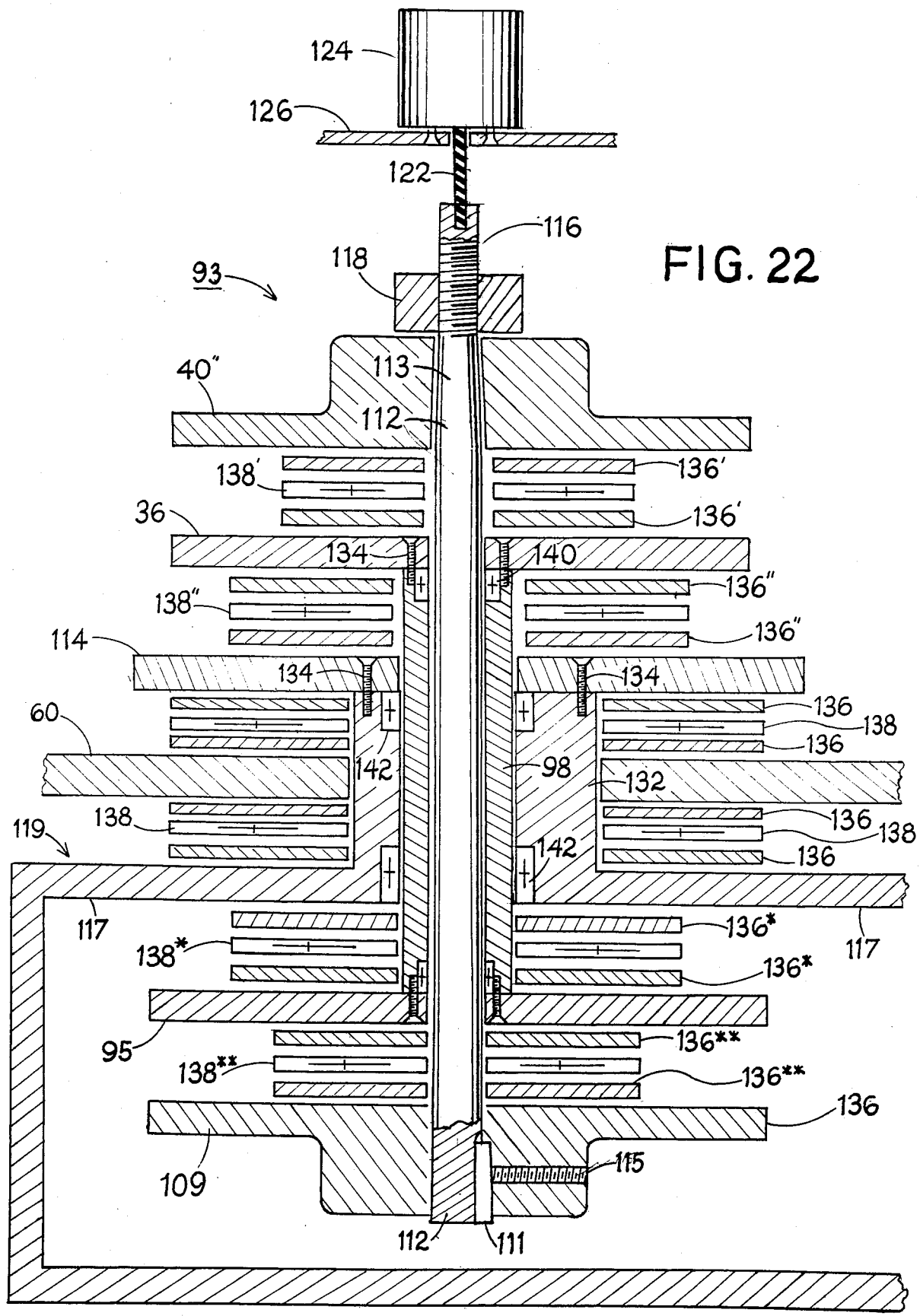
FIG. 22 is an enlarged cross-sectional view of the leg assembly driven end illustrating placement of the gear sprockets as well as the bearings and washers used to form the overall driven end of the leg assembly.

FIG. 22 illustrates a detailed, enlarged view of the leg assembly driven end 93. It is seen that the steering tube chain sprocket 40'' connects to shaft 112 at a tapered region 113. The upper portion of this tapered region terminates in a threaded section 116 about which is placed locking nut 118 for leg assemblies 90 and 91. As shown in FIG. 17, for leg assembly 92, a flex coupling 120 connects shaft 112 to shaft 117 of gear reducer 110.

As shown in FIG. 22, leg assembly 90 or 91 further includes a rubber flexible shaft 122 which mates with the upper end of threaded portion 116 of shaft 112 so as to rotate a two-channel pulse tachometer 124. The pulse tachometer is supported to the carriage base sidewall 23 (see FIG. 1) by means of a mounting bracket 126. The dual-channel tachometer gives both direction and speed information which can then be used by the robot control electronics 75 associated with the mobile base for determining its amount and direction of turning. The pulse tachometer shown is preferably one manufactured by Dynamics Research Corporation of Wilmington, Mass. Model 152-121-500-18SJ215.

FIG. 22 also shows relative placement of the power drive sprocket 36, leg assembly retraction sprocket 114, lower drive sprocket 95 and lower steering sprocket 109. The lower steering sprocket is preferably of the hub variety placed about the lower termination of shaft 112 and mated to the shaft by key 111 and set screw 115. Thus, sprocket 109 rotates corresponding to the rotation of steering chain sprocket 40'.

Likewise, lower drive sprocket 95 is mechanically interconnected to drive sprocket 36 via cylinder 98. Retraction chain sprocket 114 is connected to the leg assembly 90, 91, or 92 at the upstanding cylinder portion 132 of the leg assembly. Machine screws 134 secure the retraction chain sprocket to the upstanding cylinder portion 132 which in turn is integral with the top wall 117 of the leg assembly housing 119. The base plate 60 is positioned between the retraction chain sprocket 114 and the leg assembly 90 while flat washers 136 are sandwiched about thrust bearings 138 so as to minimize friction when the leg assemblies are retracted or extended as shown in FIGS. 20 and 21.

Similarly, flat washers 136' and thrust bearing 138' are positioned between the steering chain sprocket 40' and power drive sprocket 36 to minimize friction therebetween while flat washers 136'' and thrust bearing 138'' are positioned between power drive sprocket 36 and retraction chain sprocket 138 for similar purposes.

Ball bearings 143 are used at the lower end of shaft 34 and between the lower end of steering housing 38' and axle 28. Convex covers 145 are used to keep dirt out of the interior portion 147 of distal wheel assembly end 97. Ribs 149 are used to stiffen the overall structure.

Similar flat washers and thrust bearings are placed between the inner surface of the leg assemblies 90, 91, and 92 and the lower drive sprocket 95 as well as between the lower drive sprocket 95 and lower steering sprocket 109 as shown by washers 136* and thrust bearing 138* and washers 136 and thrust bearing 138 respectively.

In order to minimize frictional effects between shaft 112 and power shaft 98, needle roller bearings 140 are positioned as shown in FIG. 22, while roller bearings 142 are similarly employed to minimize friction between power shaft 98 and cylinder portion 132 of leg assemblies 90, 91 or 92. It is therefore readily apparent that the steering, driving and retraction movement of the leg assemblies is accomplished in an efficient and low friction manner while maintaining the attributes of the system as recited above.

Figure 23:
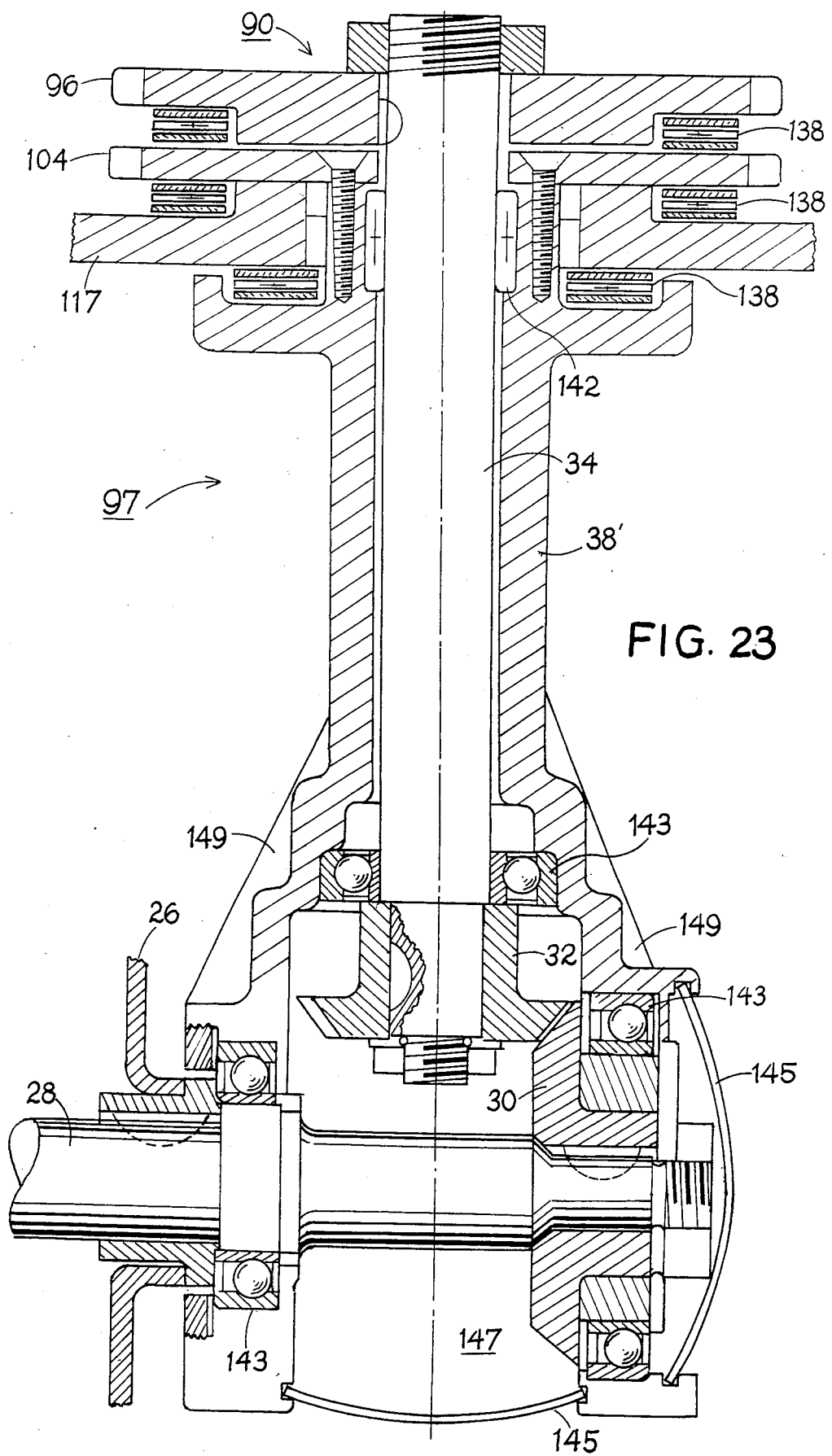
FIG. 23 is an enlarged cross-sectional view of the distal wheel assembly end of the leg assembly showing its elements in a manner similar to that in FIG. 22.

Although not shown in FIGS. 16 and 17, similar thrust bearings 138 and roller bearings 142 are employed between wheel drive sprocket 96 and Wheel steering sprocket 104 as shown in the detailed view of this portion of the leg assembly as shown in FIG. 23.

Referring again to FIGS. 15 and 19, a drive motor 144 is mounted to a gear box 146 so as to turn power drive sprocket 148 which is associated with drive chain 48. The motor is preferably a samarium-cobalt permanent magnet motor which can operate up to 5,000 revolutions per minute (r.p.m.) with a normal maximum operating speed of 3,200 r.p.m. In the preferred embodiment of the present invention it is manufactured by Inland Motors, Industrial Devices Division, Kollmorgen Corp., 201 Rock Rd. Radford, VA 24141, bearing model number TM-2950-3003-D The gear box is a 17 to 1 (17:1) gear reducer manufactured by the Sumitomo Machinery Corp. of America, Seven Malcom St. Teterboro, N.J. 07608 under the trademark 5M-Cycle.

Motor 144 is connected to gear box 146 by means of mounts 150 while mount 150' connects gear box 146 to base plate 60 of the carriage system. A flex coupling 152 connects the output shaft 153 of the motor to the input shaft 154 of the gear box.

As also shown in FIG. 15, a leg retraction servo motor 156 is mounted to base plate 60 so as to drive retraction chain 158 which controls leg assemblies 90, 91, and 92. In order to ensure that the retraction of the legs does not extend more than shown in FIG. 21 in either a clockwise or counterclockwise direction (see arrows 85 and 86), microswitches 160 and 161 are positioned in base 60 so as to be selectively operated by block 162 which is mounted on the retraction chain 158. This block activates switch 160 when the legs are retracted in the counterclockwise direction (looking down on the carriage system) as shown in FIG. 15 and activates switch 161 when the legs are retracted in the clockwise direction as shown in FIG. 15. This information actually represents a failsafe mechanism to ensure deactivation of the leg retraction servo motor if the electronics 75 associated with the mobile robot fail to deactivate activate the motor in time. Thus, in order to sense the movement of the retraction chain, a 10-turn potentiometer 168 is coupled to an idler 170 so as to turn as the retraction chain moves and thereby send analog information to circuitry 75 (see FIG. 1) associated with the mobile robot to inform the robot of the direction and amount of movement of the retraction chain. Normally this information is sufficient to control the retraction servo motor 156, but the micro-switches 160 and 161 provide additional safety backup to the overall mobile robot.

The leg retraction servo motor 156, steering motor 108 and drive motor 144 receive their electrical power from batteries 164, 165 and 166 under the control of the mobile robot within the upper torso 61 (see FIG. 1).

In addition to idler 170 used in conjunction with potentiometer 168, idlers 172 are positioned as shown in FIG. 15 so as to increase the purchase associated with the various sprockets 40, 36 and 114 as well as those associated with the retraction motor 156 and the drive motor 144 and also to maintain non-interference between the various chains 48, 54' and 158.

As also seen in FIGS. 15 and 18, a central sprocket 174 is associated with steering chain 54' so as to cause rotation of center shaft 176 which passes through top 178 of the carriage system (see FIGS. 1 and 18) so as to turn the mobile robot upper torso 61 as the carriage system executes a turn. As shown in FIG. 18, a six-wire slip ring 180 passes turret power and serial communication information to the mobile robot turret by means of cable 182 and electrical connector 183. In this way, turning the mobile base in no way interferes with the electrical connections between the carriage system and the mobile robot placed thereon.

It is therefore apparent that the present invention discloses a carriage system which provides for simultaneous driving and turning of the wheels associated with the carriage system as well as means for simultaneously extending or retracting leg assemblies associated with the carriage system. The leg assemblies allow for increased center of gravity (zone of stability) to the overall carriage system when in the extended position yet allow the carriage system to pass through relatively narrow passageways.

In both embodiments of the present invention, the carriage system is able to change the direction of the wheels of the system while rotating the wheels and thereby minimize marring of the surface upon which the carriage system is placed as well as reduce wear to the wheels. This rotation of the wheels greatly reduces the friction with the floor and thereby makes the carriage system energy efficient. The retraction or extension of the leg assemblies is also accomplished with turning of the wheels so that their orientation in the retracted position is the same as in the extended position and so that energy efficiency is increased.

The carriage systems of the present invention are found to be efficient in their usage of electricity, are easy to navigate, and have a relatively high reliability. It is therefore apparent that the objects set forth above are efficiently attained and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention what is claimed is:

1. A carriage system for movement on a surface comprising:
   (A) a base;
   (B) a plurality of wheel assemblies, each including an axle, a wheel connected to the axle at one end, the wheel having a radius (r), a first bevel gear connected to the axle at a second end thereof so as to rotate the axle and wheel, the first bevel gear having a plurality of teeth, N1, facing toward the wheel connected to the axle, where N1 is an integer, a second belve gear, having a plurality of teeth N2, where N2 is an integer, the second bevel gear perpendicularly engaged with the first bevel gear so as to impart rotation to the first bevel gear and so as to define a wheel pivot radius (r') for the wheel as the distance between the center of the second bevel gear and the wheel perimeter that contacts the surface upon which the carriage system moves, wherein the ratio of the teeth of the second bevel gear to the teeth of the first bevel gear (i.e., N2/N1) is substantially the same as the ratio of the wheel pivot radius to the wheel radius (i.e , N2/N1=r'/r), a shaft connected at one end to the second bevel gear for rotation thereof, and a cylinder positioned about the shaft and the first and second bevel gears so that rotation of the cylinder causes steering of the axle, a steering sprocket connected to the upper end of the cylinder, and a drive sprocket connected at the second end of the shaft connected to the second bevel gear so as to impart rotation of the shaft;
   (C) means connected about the steering sprocket of each cylinder so as to simultaneously turn each steering sprocket;
   (D) means connected about the drive sprockets so as to simultaneous axially rotate each drive sprocket;
   (E) first means for powering said turning means; and (F) second means for powering said axial rotation means;

whereby simultaneous steering and axial rotation of the wheels associated with each of the wheel assemblies is effected and further wherein steering of the wheel assemblies can be achieved without translation of the wheel assemblies while allowing the wheels to rotate about their axes without slippage.

2. A carriage system as defined in claim 1, wherein the turning means and the axial rotation means each comprise an endless chain positioned about the respective steering sprockets and drive sprockets of the wheel assemblies.

3. A carriage system as defined in claim 2, wherein the first and second power means are electrical motors and gear reducers connected to the output of the motors, the gear reducers having a power sprocket output for turning the respective steering chain and drive chain.

4. A carriage system for movement about a surface, comprising:

(A) a base;

(B) a plurality of wheel assemblies, each including a wheel having an axle extending therefrom, a steering sprocket interconnected to the axle to steer the axle, a drive sprocket interconnected to the axle to axially rotate the axle;

(C) extensible leg assemblies, each having a distal wheel assembly end for mounting of the respective wheel assembly, and a leg assembly dirven end, the leg assembly driven end including a lower steering sprocket and a lower drive sprocket, at the lower steering sprocket interconnected via an endless loop to the steering sprocket of the wheel assembly so as to steer the wheel; the lower drive sprocket connected to the drive sprocket of the wheel assembly by an endless loop so as to impart rotation of the wheel axle, and further wherein the leg assembly driven end comprises means for pivotally mounting to the base as well as a leg assembly retraction sprocket connected to the leg assembly so as to control pivotal rotation of the leg assembly with respect to the base and further wherein the leg assembly driven end comprises means for transferral of rotational movement to the lower steering sprocket and means for imparting rotational movement to the lower drive sprocket;

(D) means connected about the lower steering sprocket rotational movement means of each leg assembly driven end for imparting simultaneous rotation to said lower steering sprocket rotational movement means;

(E) means connected about the lower drive sprocket rotational movement means of each leg assembly driven end for imparting simultaneous rotation to said lower drive sprocket rotational movement means;

(F) means connected about each leg assembly retraction sprocket for imparting simultaneous rotation to each retraction sprocket; and (G) means for individually powering each simultaneous rotation means; whereby simultaneous steering and axial rotation of each wheel is achieved and whereby the leg assemblies can be extended outward to increase the zone of stability of the carriage systems and retracted to allow the carriage system to pass through narrow passageways.

5. A carriage system as defined in claim 4, wherein the means for imparting rotational movement to the lower steering sprocket comprises a shaft having a first end connected to the lower steering sprocket, a steering drive sprocket connected to the second end of the steering shaft and wherein the means for rotating the lower drive sprocket comprises a drive cylinder connected at one end to the lower drive sprocket and a power drive sprocket connected at the second end of the drive cylinder.

6. A carriage system as defined in claim 5, wherein the means for powering the simultaneous rotation means comprises a steering motor, a drive motor, and a retraction motor and wherein the means for simultaneously rotating the steering sprockets and drive sprockets and the leg assembly retraction sprockets comprise individual endless chains.

7. A carriage system as defined in claim 6, wherein the steering motor is directly connected to the steering shaft of one of the leg assemblies.

8. A carriage system as defined in claim 7, further comprising a potentiometer having a shaft interconnected to the leg assembly retraction chain so as to be rotated by movement of the retraction chain and so that a signal is generated by the potentiometer proportional to the pivotal movement of the leg assemblies.

9. A carriage system as defined in claim 8, wherein a pair of micro switches are mounted to the base so as to be alternatively opened and closed depending upon the leg assemblies reaching predetermined retraction limits in either the counterclockwise or clockwise direction respectively.

10. A carriage system as defined in claim 9, further comprising a block mounted to the leg retraction chain so as to cause the micro-switches to open and close.

11. A carriage system as defined in claim 4, further comprising a potentiometer interconnected to the means for imparting simultaneous rotation to each retraction sprocket so as to be rotated by movement of said imparting means and so that a signal is generated by the potentiometer proportional to the pivotal movement of the leg assemblies.

12. A carriage system as defined in claim 11, wherein a pair of micro-switches are mounted to the base so as to be alternatively opened and closed depending upon the leg assemblies reaching predetermined retraction limits in either the counterclockwise or clockwise direction respectively.

13. A carriage system as defined in claim 12, further comprising a block mounted to the means for imparting simultaneous rotation to each retraction sprocket so as to cause the micro-switches to open or close.

14. A carriage system as defined in claim 1 wherein the ratio of $r'/r$ and $N_2/N_1$ are both approximately equal to one.

15. A carriage system as defined in claim 14, wherein the turning means and the axial rotation means each comprise an endless chain positioned about the respective steering sprockets and drive sprockets of the wheel assemblies.

16. A carriage system as defined in claim 15, wherein the first and second power means comprise electrical motors and gear reducers connected to the output of the motors, the gear reducers having a power sprocket output for turning the respective steering chain and drive chain.

17. A carriage system for movement about a surface, comprising:

(A) a base;

(B) a plurality of wheel assemblies, each including an axle, a wheel connected to the axle at one end, the wheel having a radius (r), a first bevel gear connected to the axle at a second end thereof so as to rotate the axle wheel, the first bevel gear having a plurality of teeth, N1, facing toward the wheel connected to the axle, where N1 is an integer, a second bevel gear having a plurality of teeth N2, where N2 is an integer, the second bevel gear perpendicularly engaged with the first bevel gear so as to impart rotation to the first bevel gear and so as to define a wheel pivot radius (r') as the distance between the center of the second bevel gear and the wheel perimeter that contacts the surface upon which the carriage system moves, wherein the ratio of the teeth of the second bevel gear to the teeth of the first bevel gear (i.e., N2/N1) is substantially the same as the ratio of the wheel pivot radius to the wheel radius (i.e., $N2/N1=r'/r$), a shaft connected at one of the second bevel gear for rotation thereof, and an outer cylinder positioned about the shaft and the first and second bevel gears so that rotation of the cylinder causes steering of the axle, a steering sprocket connected to the upper end of the cylinder so as to impart axial rotation to the cylinder, and a drive sprocket connected at the second end of the shaft connected to the second bevel gear so as to impart rotation of the shaft;

(C) extensible leg assemblies, each having a distal wheel assembly end for mounting of the respective wheel assembly, and a leg assembly driven end, the leg assembly driven end including a lower steering sprocket and a lower drive sprocket, the lower steering sprocket interconnected via an endless loop to the steering sprocket of the wheel assembly so as to steer the wheel; the lower drive sprocket connected to the drive sprocket of the wheel assembly by an endless loop so as to impart rotation of the wheel axle, and further wherein the leg assembly driven end comprises means for pivotally mounting to the base as well as a leg assembly retraction sprocket connected to the leg assembly so as to control pivotal rotation of the leg assembly with respect to the base, and further wherein the leg assembly driven end comprises means for transferral of rotational movement to the lower steering sprocket and means for imparting rotational movement to the lower drive sprocket;

(D) means connected about the lower steering sprocket rotational movement means of each leg assembly driven end for imparting simultaneous rotation to said lower steering sprocket rotational movement means;

(E) means connected about the lower drive sprocket rotational movement means of each leg assembly driven end for imparting simultaneous rotation to said lower drive sprocket rotational movement means;

(F) means connected about each leg assembly retraction sprocket for imparting simultaneous rotation to each retraction sprocket; and (G) means for individually powering each simultaneous rotation means;

whereby simultaneous turning and axial rotation of each wheel is achieved and whereby the leg assemblies can be extended outward to increase the zone of stability of the carriage systems and retracted to allow the carriage system to pass through narrow passageways; wherein steering of the wheel assemblies can be achieved without translation of the wheel assemblies while allowing the wheels to rotate about their axes without slippage.

18. A carriage system as defined in claim 17, wherein the means for imparting rotational movement to the lower steering sprocket comprises a shaft having a first end connected to the lower steering sprocket, a steering drive sprocket connected to the second end of the steering shaft and wherein the means for rotating the lower drive sprocket comprises a drive cylinder connected at one end to the lower drive sprocket and a power drive sprocket connected at the second end of the drive cylinder.

19. A carriage system as defined in claim 18, wherein the means for powering the simultaneous rotation means comprises a steering motor, a drive motor, and a retraction motor and wherein the means for simultaneously rotating the steering sprockets and drive sprockets and the leg assembly retraction sprockets comprise individual endless chains.

20. A carriage system as defined in claim 19, wherein the steering motor is directly connected to the steering shaft of one of the leg assemblies.

21. A carriage system as defined in claim 20, further comprising a potentiometer having a shaft interconnected to the leg assembly retraction chain so as to be rotated by movement of the retraction chain and so that a signal is generated by the potentiometer proportional to the pivotal movement of the leg assemblies.

22. A carriage system as defined in claim 21, wherein a pair of micro-switches are mounted to the base so as to be alternatively opened or closed depending upon the leg assemblies reaching predetermined retraction limits in either the counterclockwise or clockwise direction respectively.

23. A carriage system as defined in claim 22, further comprising a block mounted to the leg retraction chain so as to cause the micro-switches to open or close.

* * * * *